(12) United States Patent
Kim et al.

(10) Patent No.: US 10,466,529 B2
(45) Date of Patent: Nov. 5, 2019

(54) DISPLAY DEVICE

(71) Applicant: SAMSUNG DISPLAY CO., LTD., Yongin-si, Gyeonggi-do (KR)

(72) Inventors: Kyungbae Kim, Seongnam-si (KR); Ilgon Kim, Seoul (KR); Hyunjoon Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/830,993

(22) Filed: Dec. 4, 2017

(65) Prior Publication Data

US 2018/0157104 A1 Jun. 7, 2018

(30) Foreign Application Priority Data

Dec. 5, 2016 (KR) .......................... 10-2016-0164531

(51) Int. Cl.
*G02F 1/1335* (2006.01)
*G02F 1/1368* (2006.01)
(Continued)

(52) U.S. Cl.
CPC ...... *G02F 1/133514* (2013.01); *G02F 1/1368* (2013.01); *G02F 1/13394* (2013.01); *G02F 1/133512* (2013.01); *G02F 1/133528* (2013.01); *G02F 1/133555* (2013.01); *G02F 1/134336* (2013.01); *G02F 1/136227* (2013.01); *G02F 1/136286* (2013.01); *G02F 2001/13398* (2013.01); *G02F 2001/133519* (2013.01);
(Continued)

(58) Field of Classification Search
CPC ............. H01L 27/3246; H01L 27/3244; H01L 27/3272; H01L 27/3218; H01L 27/3216; H01L 27/326; G02F 1/133512; G02F 1/134336; G02F 1/136209; G02F 2201/52
See application file for complete search history.

(56) References Cited

U.S. PATENT DOCUMENTS 6,297,589 B1  10/2001 Miyaguchi et al.
2012/0056531 A1*  3/2012 Park ................... H01L 51/5036
                                                                    313/506
(Continued)

FOREIGN PATENT DOCUMENTS

JP          2000-91069 A       3/2000
KR  10-2011-0075718 A       7/2011
(Continued)

*Primary Examiner* — Frederick B Hargrove
(74) *Attorney, Agent, or Firm* — Innovation Counsel LLP

(57) ABSTRACT

A display device is capable of improving image quality including: a first and second substrate; a first and second color layer adjacent to each other between the first and second substrate, and arranged along a first direction; a third color layer including a first divided color layer adjacent to the first color layer in a second direction and a second divided color layer adjacent to the first divided color layer the first direction and adjacent to the second color layer in the second direction; a light blocking layer including a light blocking portion between the first and second color layer and a light blocking portion between the first and second divided color layer. The first, second and third color layer emit lights of different colors and at least two of them have different sizes. A width of the first and second light blocking portion is substantially equal.

41 Claims, 21 Drawing Sheets

(51) Int. Cl.
*G02F 1/1343* (2006.01)
*G02F 1/1339* (2006.01)
*G02F 1/1362* (2006.01)
(52) U.S. Cl.
CPC ............ *G02F 2001/133548* (2013.01); *G02F 2001/134345* (2013.01); *G02F 2201/52* (2013.01)

(56) References Cited

U.S. PATENT DOCUMENTS

| | | | |
|---|---|---|---|
| 2015/0129856 A1* | 5/2015 | Kim | H01L 27/3218 |
| | | | 257/40 |
| 2015/0234239 A1* | 8/2015 | Son | G02F 1/133753 |
| | | | 349/33 |
| 2016/0062178 A1 | 3/2016 | Kim et al. | |
| 2016/0116808 A1* | 4/2016 | Higano | G02F 1/134309 |
| | | | 349/110 |

FOREIGN PATENT DOCUMENTS

| KR | 10-2016-0028580 A | 3/2016 |
|---|---|---|
| KR | 10-1641364 B1 | 7/2016 |

* cited by examiner

DISPLAY DEVICE

CROSS-REFERENCE TO RELATED APPLICATION

This application claims priority under 35 U.S.C. § 119 to Korean Patent Application No. 10-2016-0164531, filed on Dec. 5, 2016, in the Korean Intellectual Property Office (KIPO), the disclosure of which is incorporated by reference herein in its entirety.

TECHNICAL FIELD

Embodiments of the present inventive concept relate to a display device, and more particularly, to a display device capable of improving image quality.

DISCUSSION OF RELATED ART

Liquid crystal display ("LCD") devices are one of most widely used types of flat panel display ("FPD") devices. An LCD device includes two substrates including electrodes formed thereon and a liquid crystal layer interposed therebetween.

Upon applying voltage to the two electrodes, liquid crystal molecules of the liquid crystal layer are rearranged such that an amount of transmitted light is controlled in the LCD device.

The above information disclosed in this Background section is only for enhancement of understanding of the background of the inventive concept, and, accordingly, it may contain information that does not form the prior art that is already known in this country to a person of ordinary skill in the art.

SUMMARY

Aspects of embodiments of the present inventive concept are directed to a display device capable of improving image quality.

According to an exemplary embodiment, a display device includes: a first substrate and a second substrate spaced apart from each other; a first color layer and a second color layer adjacent to each other between the first substrate and the second substrate, the first color layer and the second color layer arranged along a direction parallel to a first direction; a third color layer including a first divided color layer adjacent to the first color layer in a direction parallel to a second direction crossing the first direction and a second divided color layer adjacent to the first divided color layer in a direction parallel to the first direction and adjacent to the second color layer in a direction parallel to the second direction; and a light blocking layer including a first light blocking portion between the first color layer and the second color layer and a second light blocking portion between the first divided color layer and the second divided color layer. The first color layer, the second color layer and the third color layer are configured to emit lights of different colors, respectively. At least two of the first color layer, the second color layer and the third color layer have different sizes. A width of the first light blocking portion in a direction parallel to the first direction is substantially equal to a width of the second light blocking portion in a direction parallel to the first direction.

The first color layer, the second color layer and the third color layer may be included in one unit pixel.

Each of the first substrate and the second substrate may have a curved surface curved along a direction parallel to the first direction.

The display device may further include a fourth color layer adjacent to the second color layer in a direction parallel to the first direction, the fourth color layer configured to emit a light having a color substantially the same as a color of a light configured to be emitted by the second color layer; and a fifth color layer adjacent to the fourth color layer in a direction parallel to the second direction and adjacent to the third color layer in a direction parallel to the first direction, the fifth color layer configured to emit a light having a color substantially the same as a color of a light configured to be emitted by the third color layer.

The first color layer, the second color layer and the third color layer may be included in a first unit pixel, and the fourth color layer and the fifth color layer may be included in a second unit pixel.

The first unit pixel and the second unit pixel may have a symmetric shape with respect to an imaginary line parallel to the second direction.

A distance between the second color layer and the fourth color layer may be less than a distance between the first color layer and the second color layer.

The light blocking layer may be absent between the second color layer and the fourth color layer.

The fifth color layer may include a first divided color layer and a second divided color layer adjacent to each other in a direction parallel to the first direction, the first divided color layer of the fifth color layer may be adjacent to the second divided color layer of the third color layer in a direction parallel to the first direction, and a distance between the second divided color layer of the third color layer and the first divided color layer of the fifth color layer may be less than a distance between the first divided color layer of the third color layer and the second divided color layer of the third color layer.

The light blocking layer may be absent between the second divided color layer of the third color layer and the first divided color layer of the fifth color layer.

The display device may further include: a first pixel electrode located on the first substrate corresponding to the first color layer; a second pixel electrode located on the first substrate corresponding to the second color layer; and a third pixel electrode including a first divided pixel electrode located corresponding to the first divided color layer and a second divided pixel electrode located corresponding to the second divided color layer.

At least two of the first pixel electrode, the second pixel electrode and the third pixel electrode may have different sizes.

The display device may further include: a first switching element connected to the first pixel electrode; a second switching element connected to the second pixel electrode; and a third switching element connected to the first divided pixel electrode and the second divided pixel electrode.

The display device may further include: a first data line connected to the first switching element; a second data line connected to the second switching element; a third data line connected to the third switching element; and a gate line connected to the first switching element, the second switching element and the third switching element and crossing the first data line, the second data line and the third data line.

At least a portion of the first data line, at least a portion of the second data line and at least a portion of the third data line may be located between the first color layer and the second color layer.

At least a portion of the first data line, at least a portion of the second data line and at least a portion of the third data line may be located between the first divided color layer and the second divided color layer.

At least a portion of the gate line may be located between the first color layer and the first divided color layer.

At least a portion of the gate line may be located between the second color layer and the second divided color layer.

The first color layer may be located at a first quadrant of quadrants which are defined by the gate line and one of the first data line, the second data line and the third data line, the second color layer may be located at a second quadrant of the quadrants, the first divided color layer may be located at a third quadrant of the quadrants, and the second divided color layer may be located at a fourth quadrant of the quadrants.

At least one of the first color layer, the second color layer, the first divided color layer and the second divided color layer may include a color conversion layer between the first substrate and the second substrate.

At least one of the first color layer, the second color layer, the first divided color layer and the second divided color layer may further include a color filter layer between the color conversion layer and the second substrate.

The display device may further include a polarization layer between the first substrate and the second substrate to overlap the first color layer, the second color layer, the third color layer and the light blocking layer.

Facing edge portions of the first color layer and the second color layer may overlap opposite edge portions of the first light blocking portion, and facing edge portions of the first divided color layer and the second divided color layer may overlap opposite edge portions of the second light blocking portion.

The first light blocking portion and the second light blocking portion may be unitary.

The first light blocking portion and the second light blocking portion which are unitary may have a straight line shape.

The display device may further include a backlight unit facing the second substrate with the first substrate interposed between the backlight unit and the second substrate.

The backlight unit may provide a white light or a blue light.

The display device may further include a polarization plate between the backlight unit and the first substrate.

According to an exemplary embodiment, a display device includes: a first substrate and a second substrate spaced apart from each other; a gate line on the first substrate; a first data line, a second data line and a third data line crossing the gate line; a first switching element connected to the gate line and the first data line; a second switching element connected to the gate line and the second data line; a third switching element connected to the gate line and the third data line; a first pixel electrode connected to the first switching element; a second pixel electrode connected to the second switching element and located adjacent to the first pixel electrode in a direction parallel to a first direction; and a third pixel electrode connected to the third switching element. The third pixel electrode may include: a first divided pixel electrode adjacent to the first pixel electrode in a direction parallel to a second direction crossing the first direction; and a second divided pixel electrode adjacent to the first divided pixel electrode in a direction parallel to the first direction and adjacent to the second pixel electrode in a direction parallel to the second direction.

The first pixel electrode, the second pixel electrode and the third pixel electrode may be included in one unit pixel.

Each of the first substrate and the second substrate may have a curved surface curved along a direction parallel to the first direction.

The display device may further include a light blocking layer between the first substrate and the second substrate. The light blocking layer may include: a first light blocking portion overlapping an area between the first pixel electrode and the second pixel electrode and overlapping facing edge portions of the first pixel electrode and the second pixel electrode; and a second light blocking portion overlapping an area between the first divided pixel electrode and the second divided pixel electrode and overlapping facing edge portions of the first divided pixel electrode and the second divided pixel electrode.

A width of the first light blocking portion in a direction parallel to the first direction may be substantially equal to a width of the second light blocking portion in a direction parallel to the first direction.

The first light blocking portion and the second light blocking portion may be unitary.

The first light blocking portion and the second light blocking portion which are unitary may have a straight line shape.

At least two of the first pixel electrode, the second pixel electrode and the third pixel electrode may have different sizes.

A distance between the first pixel electrode and the second pixel electrode may be substantially equal to a distance between the first divided pixel electrode and the second divided pixel electrode.

The first pixel electrode may be located at a first quadrant of quadrants which are defined by the gate line and one of the first data line, the second data line and the third data line, the second pixel electrode may be located at a second quadrant of the quadrants, the first divided pixel electrode may be located at a third quadrant of the quadrants, and the second divided pixel electrode may be located at a fourth quadrant of the quadrants.

The display device may further include: a first color layer located corresponding to the first pixel electrode; a second color layer located corresponding to the second pixel electrode; and a third color layer including a first divided color layer located corresponding to the first divided pixel electrode and a second divided color layer located corresponding to the second divided pixel electrode.

The first color layer, the second color layer and the third color layer may be configured to emit lights of different colors, respectively, and the first divided color layer and the second divided color layer may be configured to emit lights of a substantially same color.

At least two of the first color layer, the second color layer and the third color layer may have different sizes.

The foregoing is illustrative only and is not intended to be in any way limiting. In addition to the illustrative aspects, exemplary embodiments, and features described above, further aspects, exemplary embodiments, and features will become apparent by reference to the drawings and the following detailed description.

BRIEF DESCRIPTION OF THE DRAWINGS

A more complete appreciation according to an exemplary embodiment will become more apparent by describing in detail exemplary embodiments thereof with reference to the accompanying drawings, wherein.

DETAILED DESCRIPTION

Figure 1:
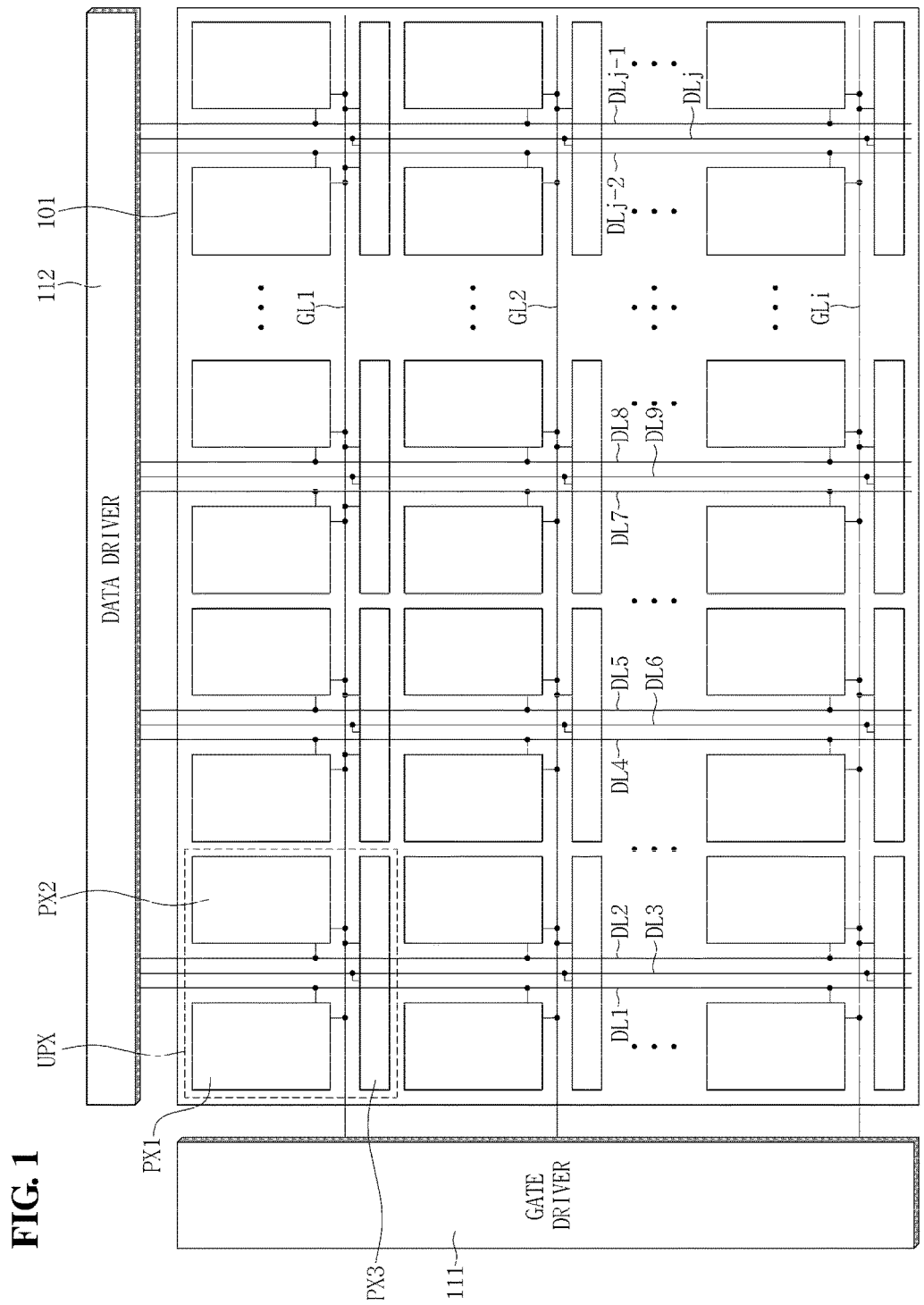
FIG. 1 is a view illustrating a display device according to an exemplary embodiment.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on another layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below another layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below," "beneath," "lower," "above," "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device located "below" or "beneath" another device may be placed "above" another device. Accordingly, the illustrative term "below" may include both the lower and upper positions. The device may also be oriented in another direction, and thus the spatially relative terms may be interpreted differently depending on the orientations.

Throughout the specification, when an element is referred to as being "connected" to another element, the element is "directly connected" to another element, or "electrically connected" to another element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to As a more detailed example describe exemplary embodiments according to an exemplary embodiment, and like reference numerals refer to like elements throughout the specification.

Hereinafter, a display device according to an exemplary embodiment will be described with reference to FIGS. 1 to 21.

FIG. 1 is a view illustrating a display device according to an exemplary embodiment.

As illustrated in FIG. 1, the display device according to an exemplary embodiment includes a display panel 101, a gate driver 111 and a data driver 112.

The display panel 101 includes a plurality of gate lines GL1 to GLi, a plurality of data lines DL1 to DLj and a plurality of unit pixels UPX.

Each unit pixel UPX includes three pixels adjacent to each other with respect to a gate line and a data line as a boundary. For example, one unit pixel UPX includes a first pixel PX1, a second pixel PX2 and a third pixel PX3.

When one of a first data line DL1, a second data line DL2 and a third data line DL3 is defined as a reference data line, a planar surface is divided into four quadrants by a first gate line GL1 and the reference data line crossing each other, as illustrated in FIG. 1. In such an exemplary embodiment, the four quadrants will be respectively defined as a second quadrant, a first quadrant, a third quadrant and a fourth quadrant in counterclockwise order from an upper right quadrant. That is, an inner surface of a first substrate 301 (see FIG. 6) to be described below may be divided into a first quadrant, a second quadrant, a third quadrant and a fourth quadrant.

Of the first, second and third pixels PX1, PX2 and PX3 included in one unit pixel UPX, the first pixel PX1 is located in the first quadrant, the second pixel PX2 is located in the second quadrant, a portion of the third pixels PX3 is located in the third quadrant, and another part of the third pixel PX3 is located in the fourth quadrant.

Of the first pixel PX1, the second pixel PX2 and the third pixel PX3, one pixel may be a red pixel emitting a red light, another pixel may be a green pixel emitting a green light, and the other pixel may be a blue pixel emitting a blue light.

Of the first, second and third pixels PX1, PX2 and PX3 included in one unit pixel UPX, the first pixel PX1 and the second pixel PX2 face each other, having at least one data line therebetween. In other words, the first pixel PX1 and the second pixel PX2 are located adjacent to each other with at least one data line therebetween. For example, the first pixel PX1 and the second pixel PX2 of one unit pixel UPX are located adjacent to each other, having the first data line DL1, the second data line DL2 and the third data line DL3 therebetween. At least a portion of the first data line DL1, at least a portion of the second data line DL2 and at least a portion of the third data line DL3 are located between the first pixel PX1 and the second pixel PX2.

Of the first, second and third pixels PX1, PX2 and PX3 included in one unit pixel UPX, the third pixel PX3 faces the first pixel PX1 and the second pixel PX2, having the gate line therebetween. In other words, a portion of the third pixel PX3 and the first pixel PX1 are located adjacent to each other with a gate line therebetween, and another part of the third pixel PX3 and the second pixel PX2 are located adjacent to each other with the gate line therebetween, each of these portions of the third pixel PX3 respectively adjacent to the first pixel PX1 and second pixel PX2 in a different direction than the direction of adjacency between first pixel PX1 and second pixel PX2. For example, a portion of the third pixel PX3 and the first pixel PX1 included in one unit pixel UPX are located adjacent to each other with the first gate line GL1 therebetween, and another part of the third pixel PX3 and the second pixel PX2 included in the unit pixel UPX are located adjacent to each other with the first gate line GL1 therebetween.

Each pixel is connected to a gate line and a data line. In such an exemplary embodiment, pixels included in one unit pixel UPX are connected in common to one gate line and respectively connected to different data lines. For example, the first pixel PX1 of one unit pixel UPX is connected to the first gate line GL1 and the first data line DL1, the second pixel PX2 of said unit pixel UPX is connected to the first gate line GL1 and the second data line DL2, and the third pixel PX3 of said unit pixel UPX is connected to the first gate line GL1 and the third data line DL3.

The third pixel PX3 crosses at least one data line. For example, the third pixel PX3 included in one unit pixel UPX crosses the first, second and third data lines DL1, DL2 and DL3.

The gate driver 111 generates gate signals according to a gate control signal applied from a timing controller (not illustrated) and sequentially applies the gate signals to the plurality of gate lines GL1 to GLi. The gate driver 111, for example, may include a shift register which shifts a gate start pulse according to a gate shift clock to thereby generate gate signals. The gate driver 111 may be located at a non-display area of the display panel 101.

The data driver 112 receives image data signals and a data control signal from the timing controller. The data driver 112 samples the image data signals according to the data control signal, latches the sampled image data signals corresponding to one horizontal line each horizontal period, and applies the latched image data signals to the data lines DL1 to DLj. That is, the data driver 112 converts the image data signals applied from the timing controller into analog image data signals by using gamma reference voltages input from a power supply, and applies the converted image data signals to the data lines DL1 to DLj.

Figure 2:
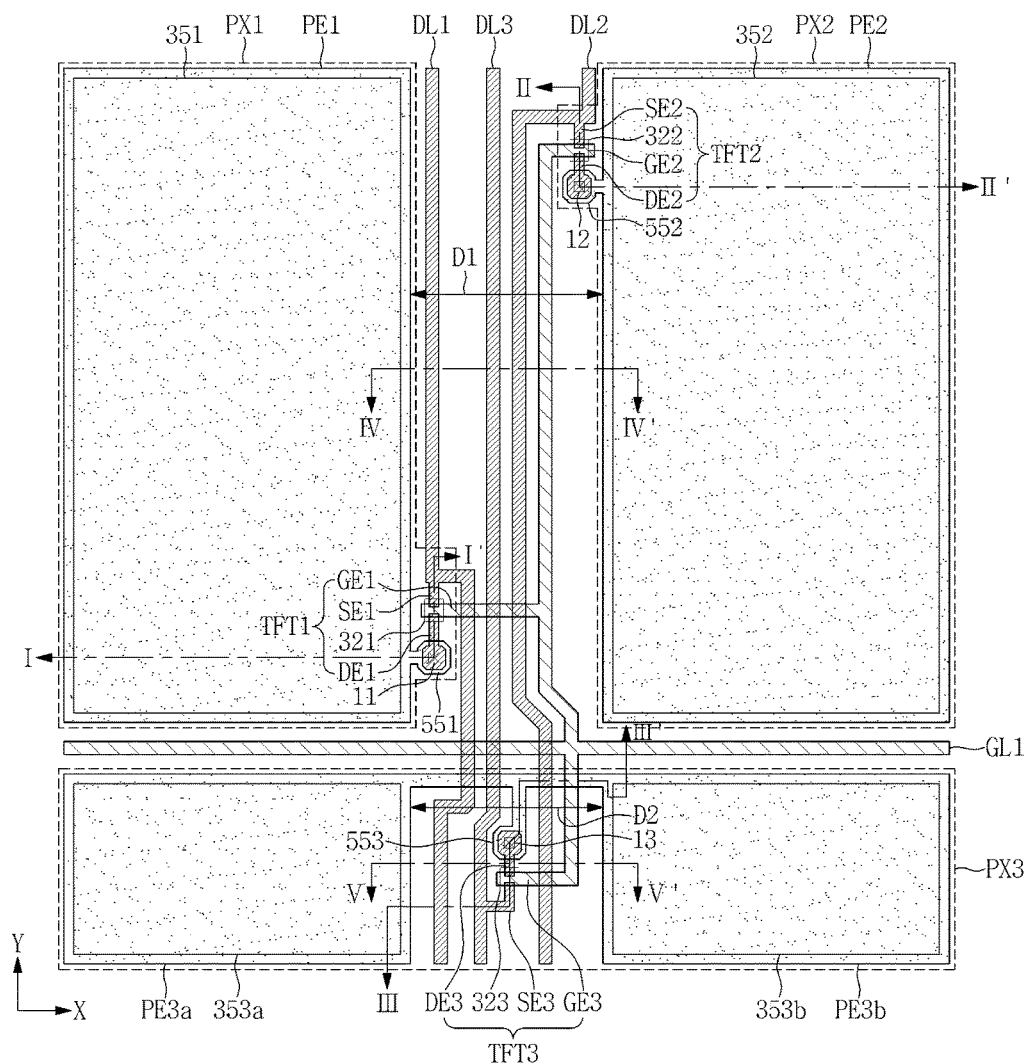
FIG. 2 is a detailed configuration view illustrating a unit pixel of FIG. 1.
Figure 3:
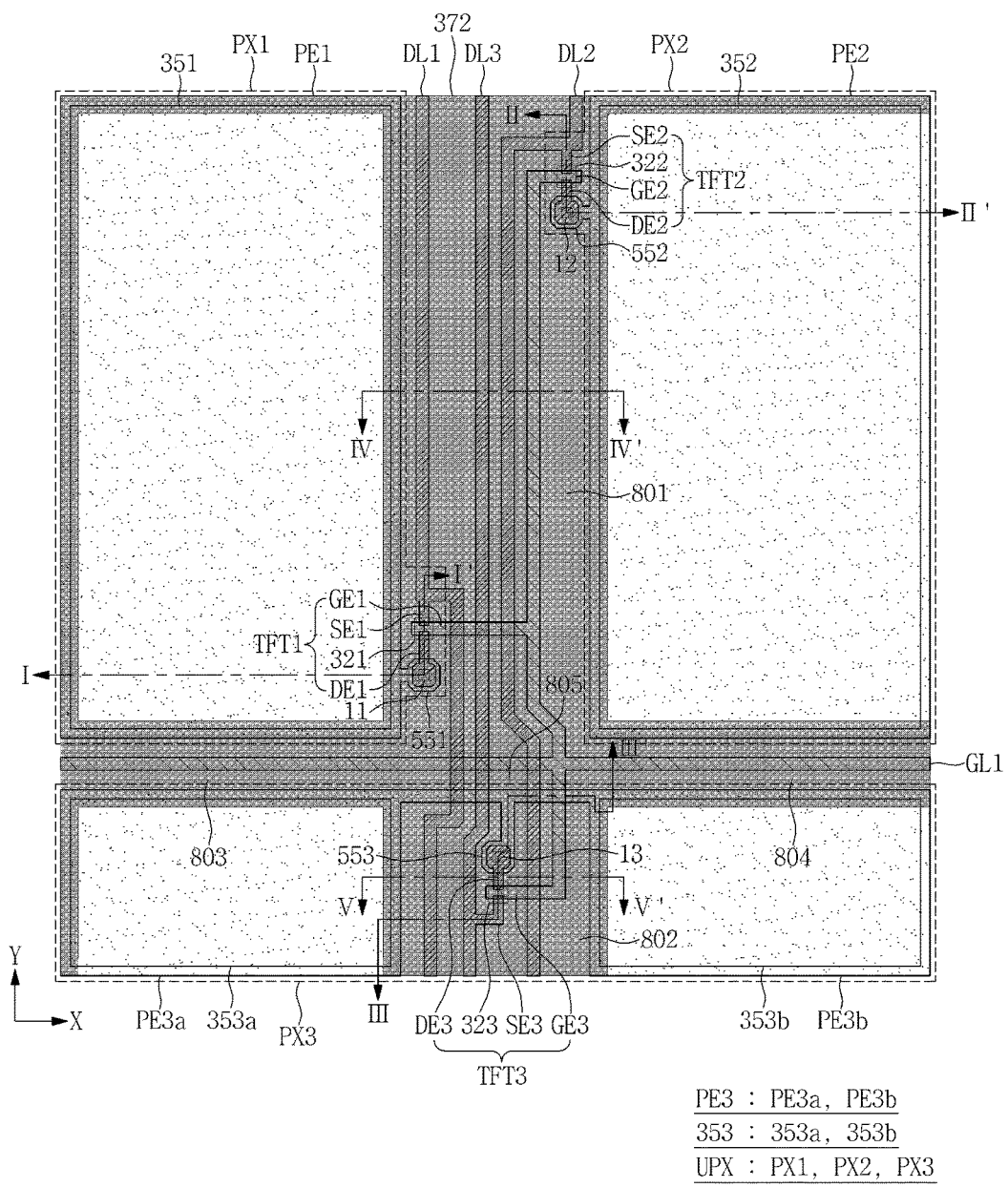
FIG. 3 is a view illustrating the structure of FIG. 2 further including a second light blocking layer.
Figure 4:
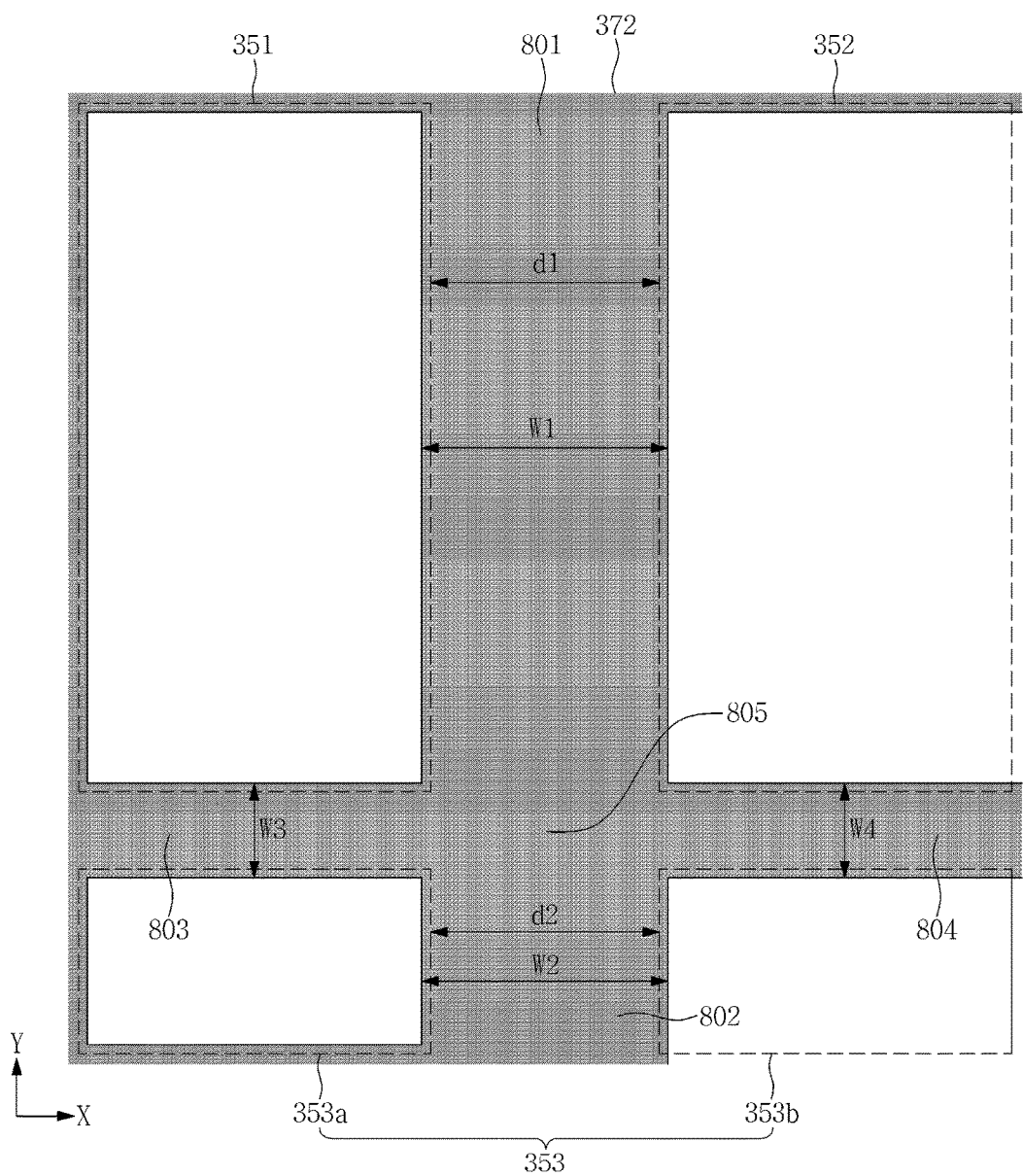
FIG. 4 is a view separately illustrating a color layer and a light blocking layer in the structure of FIG. 3.
Figure 5:
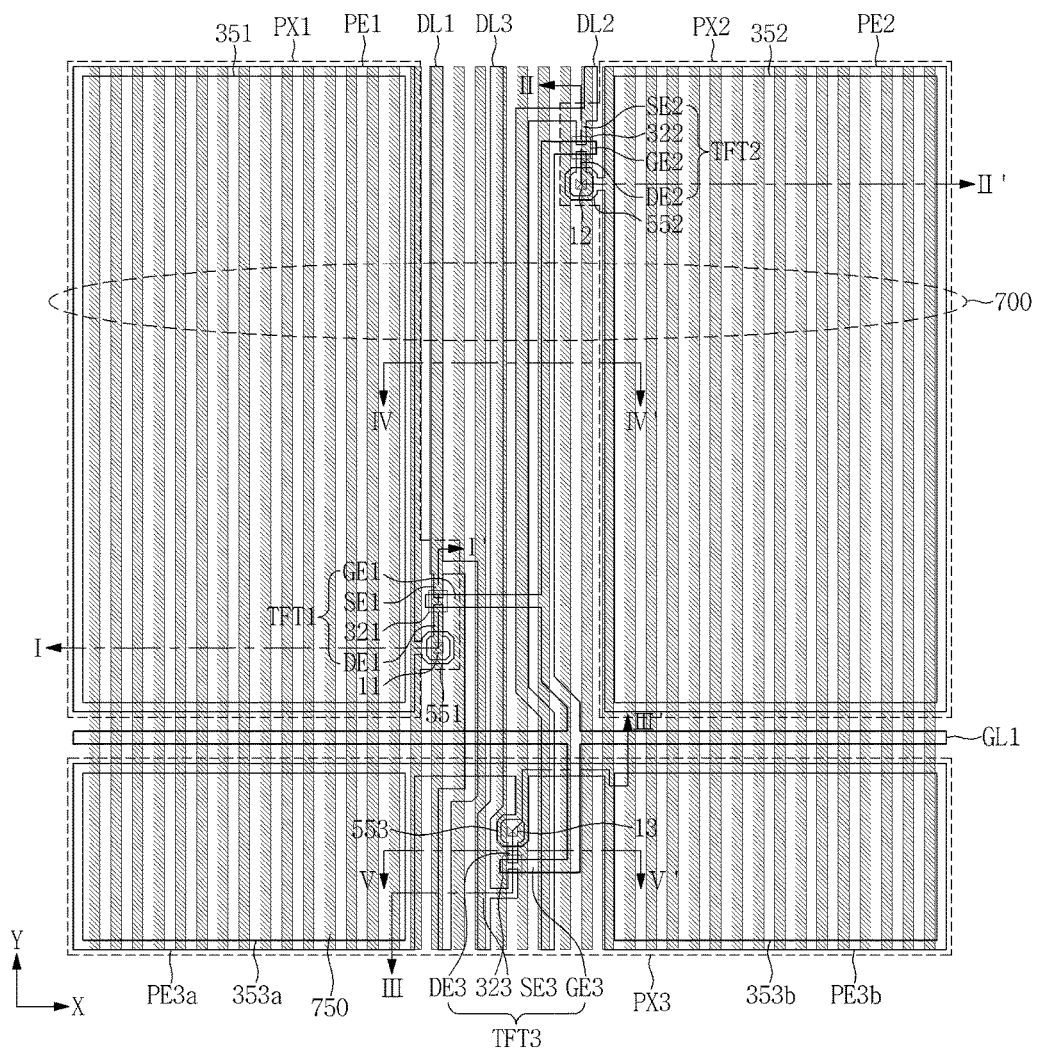
FIG. 5 is a view illustrating the structure of FIG. 2 further including a polarization layer.

FIG. 2 is a detailed configuration view illustrating the unit pixel UPX of FIG. 1, FIG. 3 is a view illustrating the structure of FIG. 2 further including a second light blocking layer, FIG. 4 is a view separately illustrating a color layer and a light blocking layer in the structure of FIG. 3, and FIG. 5 is a view illustrating the structure of FIG. 2 further including a polarization layer.

Figure 6:
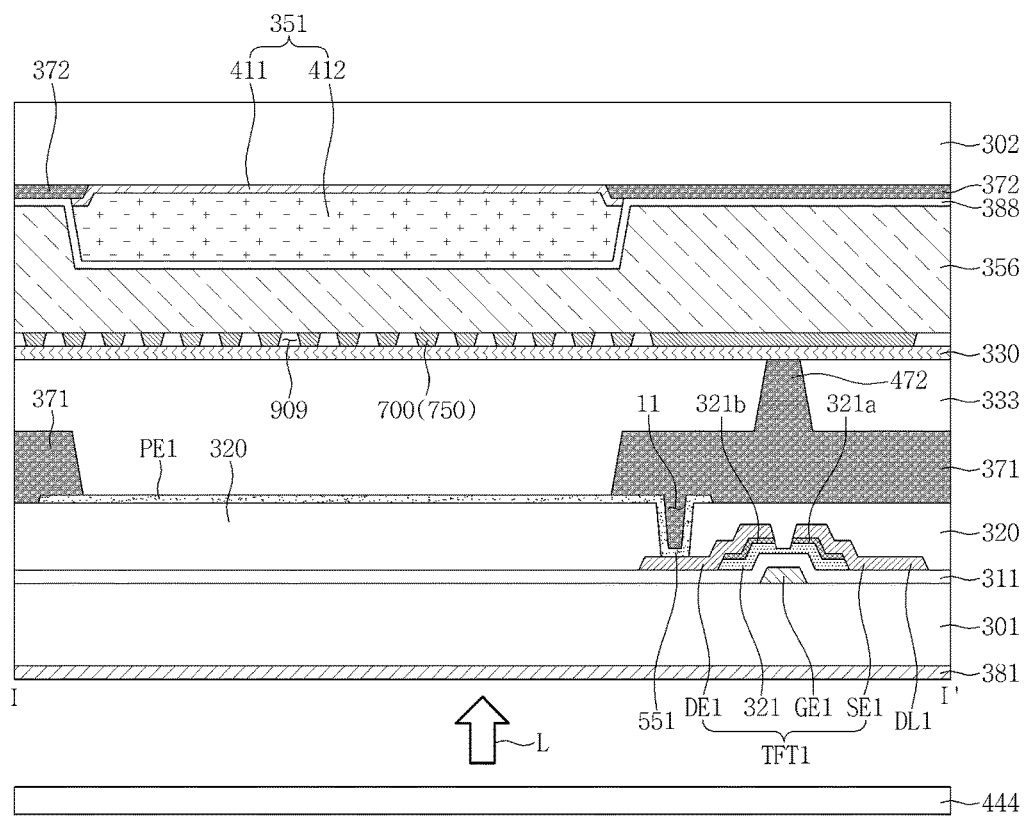
FIG. 6 is a cross-sectional view taken along the line I-I' of FIG. 3.
Figure 7:
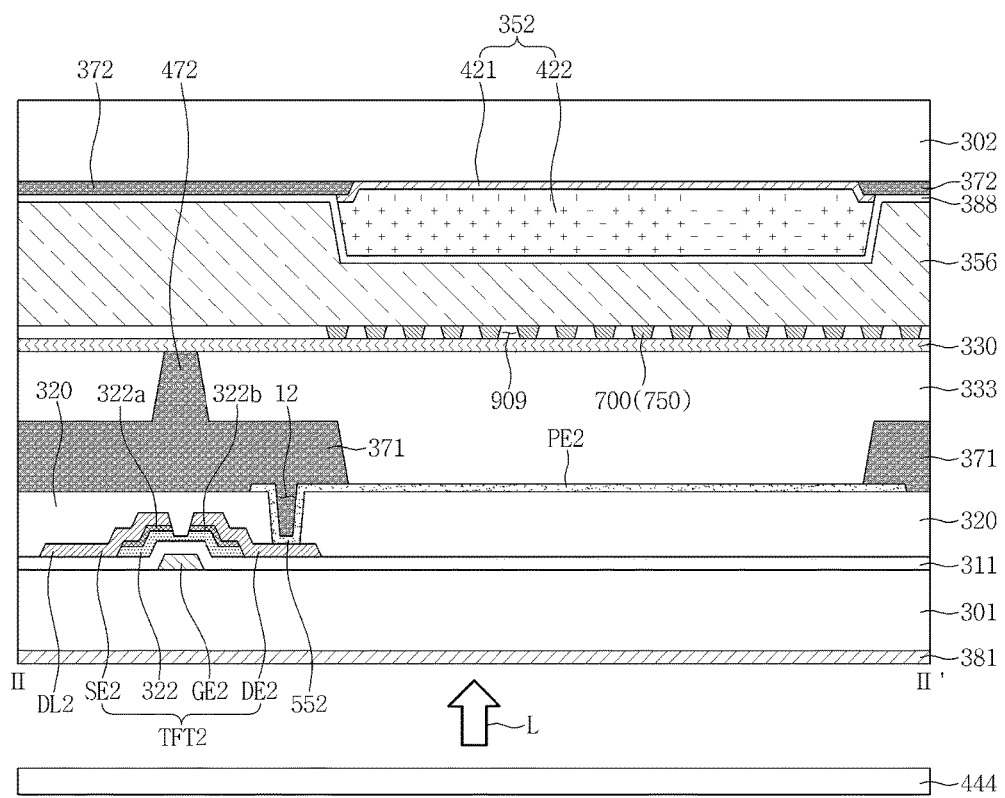
FIG. 7 is a cross-sectional view taken along the line II-II' of FIG. 2.
Figure 8:
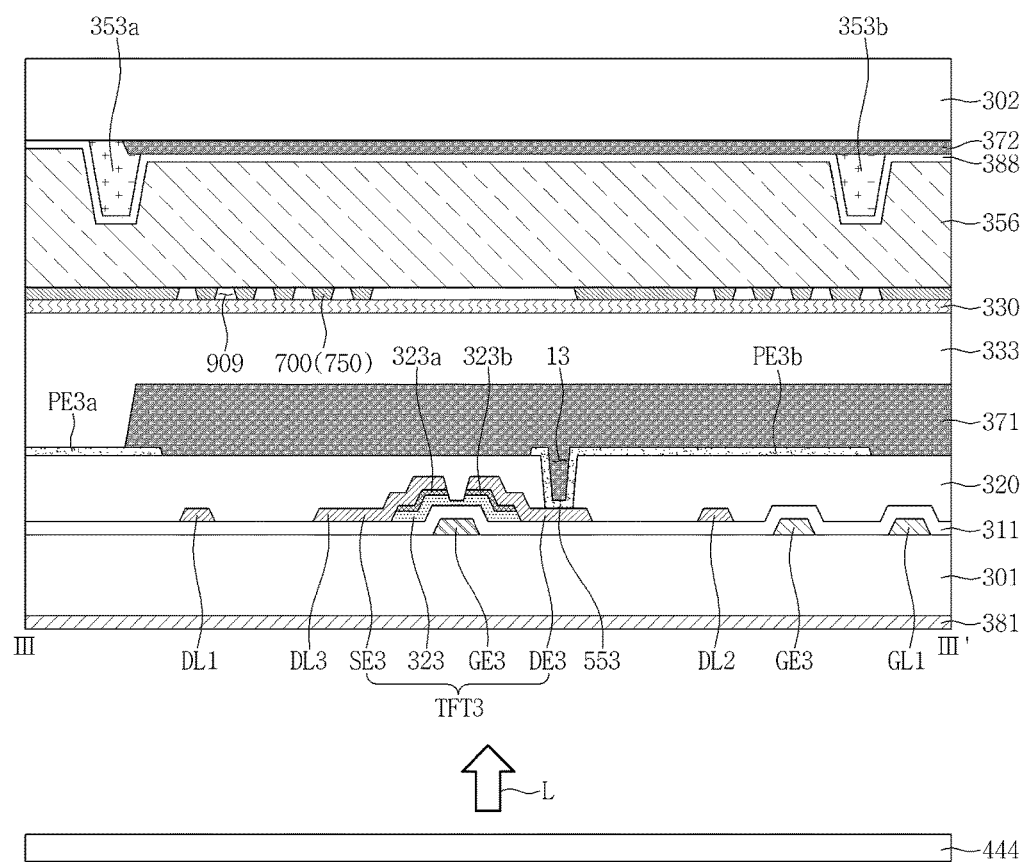
FIG. 8 is a cross-sectional view taken along the line III-III' of FIG. 2.
Figure 9:
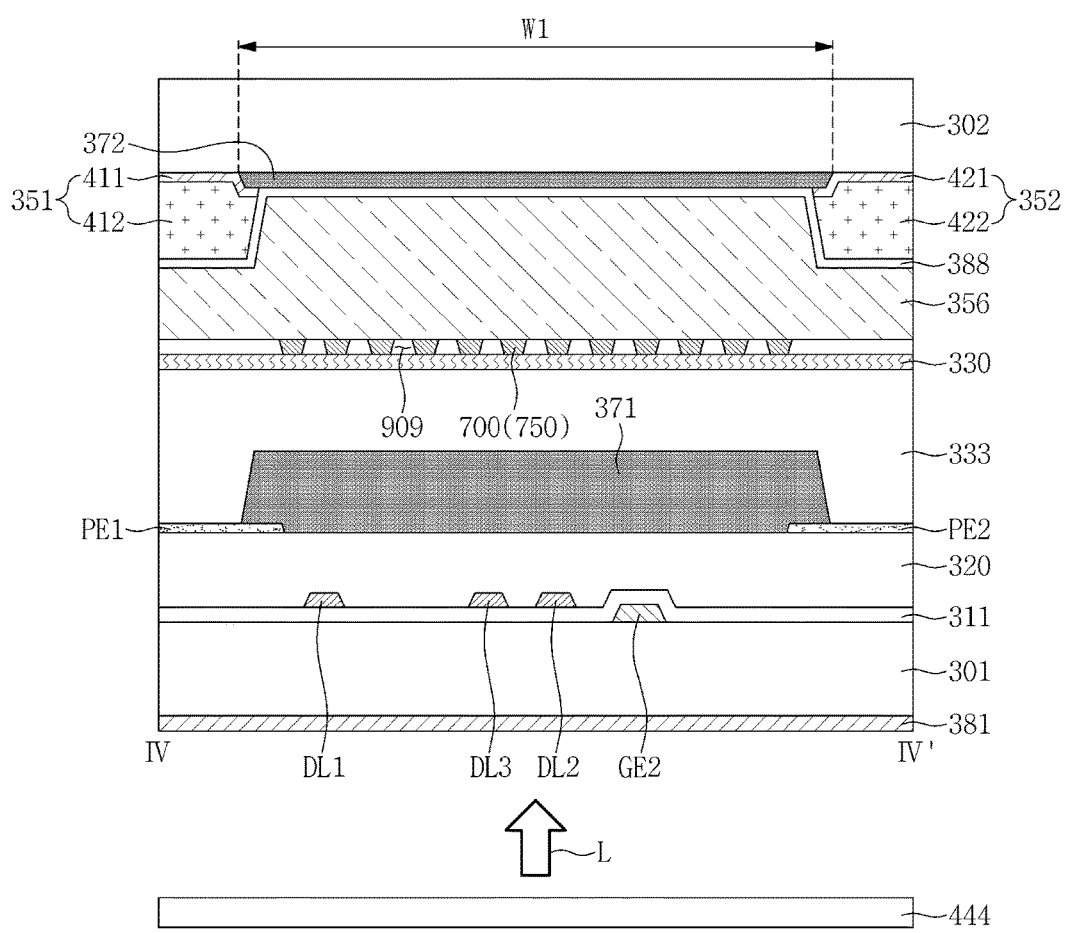
FIG. 9 is a cross-sectional view taken along the line IV-IV' of FIG. 2.
Figure 10:
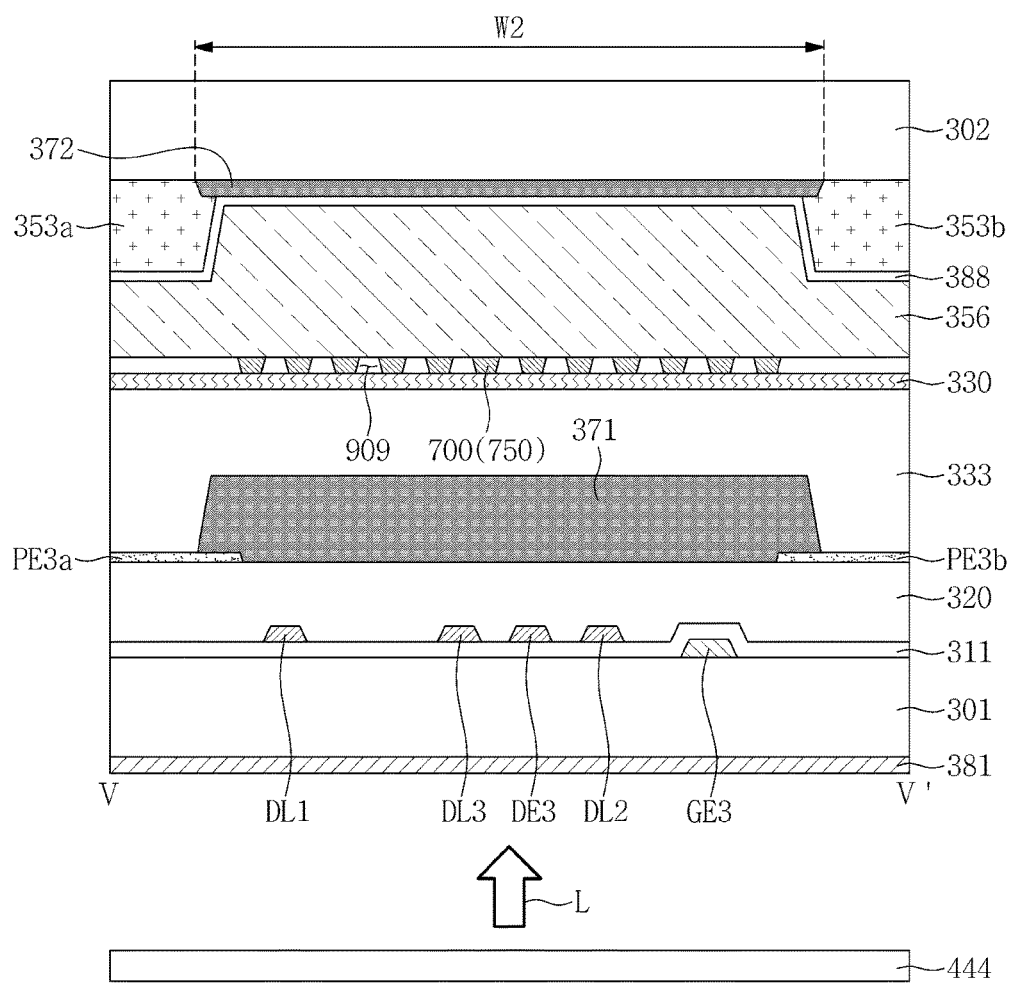
FIG. 10 is a cross-sectional view taken along the line V-V' of FIG. 2.

FIG. 6 is a cross-sectional view taken along the line I-I' of FIG. 3, FIG. 7 is a cross-sectional view taken along the line II-II' of FIG. 2, FIG. 8 is a cross-sectional view taken along the line III-III' of FIG. 2, FIG. 9 is a cross-sectional view taken along the line IV-IV' of FIG. 2, and FIG. 10 is a cross-sectional view taken along the line V-V' of FIG. 2. Herein, FIGS. 6, 7, 8, 9 and 10 include cross-sections of the second light blocking layer of FIG. 3 and the polarization layer of FIG. 5.

As illustrated in FIG. 2, the unit pixel UPX includes the first pixel PX1, the second pixel PX2 and the third pixel PX3.

As illustrated in FIG. 2, the first pixel PX1 includes a first switching element TFT1, a first pixel electrode PE1 and a first color layer 351.

The first switching element TFT1 includes a first semiconductor layer 321, a first gate electrode GE1, a first source electrode SE1 and a first drain electrode DE1. The first gate electrode GE1 is connected to the first gate line GL1, the first source electrode SE1 is connected to the first data line DL1, and the first drain electrode DE1 is connected to the first pixel electrode PE1.

As illustrated in FIG. 2, the second pixel PX2 includes a second switching element TFT2, a second pixel electrode PE2 and a second color layer 352.

The second switching element TFT2 includes a second semiconductor layer 322, a second gate electrode GE2, a second source electrode SE2 and a second drain electrode DE2. The second gate electrode GE2 is connected to the first gate line GL1, the second source electrode SE2 is connected to the second data line DL2, and the second drain electrode DE2 is connected to the second pixel electrode PE2.

As illustrated in FIG. 2, the third pixel PX3 includes a third switching element TFT3, a third pixel electrode PE3 and a third color layer 353.

The third switching element TFT3 includes a third semiconductor layer 323, a third gate electrode GE3, a third source electrode SE3 and a third drain electrode DE3. The third gate electrode GE3 is connected to the first gate line GL1, the third source electrode SE3 is connected to the third data line DL3, and the third drain electrode DE3 is connected to the third pixel electrode PE3.

The first pixel PX1, the second pixel PX2 and the third pixel PX3 are located between the first substrate 301 (see FIG. 6) and a second substrate 302 (see FIG. 6) of the display panel 101. In other words, as illustrated in FIGS. 6, 7, 8, 9 and 10, the display panel 101 includes the first substrate 301 and the second substrate 302 spaced apart from each other by a predetermined distance. In such an exemplary embodiment, the first switching element TFT1, the first pixel electrode PE1, the first color layer 351, the second switching element TFT2, the second pixel electrode PE2, the second color layer 352, the third switching element TFT3, the third pixel electrode PE3 and the third color layer 353 are located between the first substrate 301 and the second substrate 302.

In addition, the first gate line GL1, the first data line DL1, the second data line DL2, the third data line DL3, a gate insulating layer 311, a protection layer 320, a first light blocking layer 371, a column spacer 472, a liquid crystal layer 333, a common electrode 330, a polarization layer 700, a planarization layer 356, a dichroic reflection layer 388 and a second light blocking layer 372 are located between the first substrate 301 and the second substrate 302.

As illustrated in FIG. 2, the first gate line GL1 extends in a direction parallel to an X axis (hereinafter, "an X-axis direction"). As illustrated in FIG. 8, the first gate line GL1 is located on the first substrate 301.

As illustrated in FIG. 2, the first gate line GL1 is connected to the first gate electrode GE1, the second gate electrode GE2 and the third gate electrode GE3. The first gate line GL1, the first gate electrode GE1, the second gate electrode GE2 and the third gate electrode GE3 may be unitary (e.g., integrally formed in a monolithic structure).

Although not illustrated, an end portion of the first gate line GL1 may have an area larger than an area of another portion of the first gate line GL1 for connection to another layer or an external driving circuit.

The first gate line GL1 may include one of: aluminum (Al) or alloys thereof, silver (Ag) or alloys thereof, copper (Cu) or alloys thereof, and/or molybdenum (Mo) or alloys thereof. In addition, the first gate line GL1 may include one of: chromium (Cr), tantalum (Ta) and/or titanium (Ti). In an exemplary embodiment, the first gate line GL1 may have a multilayer structure including at least two conductive layers that have different physical properties.

As illustrated in FIG. 2, the first gate electrode GE1 may have a shape protruding from the first gate line GL1. As illustrated in FIG. 6, the first gate electrode GE1 is located on the first substrate 301. The first gate electrode GE1 may be a portion of the first gate line GL1. The first gate electrode GE1 and the first gate line GL1 may be unitary (e.g., integrally formed in a monolithic structure).

The first gate electrode GE1 may include a substantially same material and may have a substantially same structure (a multilayer structure) as those of the first gate line GL1. The first gate electrode GE1 and the first gate line GL1 may be substantially simultaneously formed in a substantially same process.

As illustrated in FIG. 2, the second gate electrode GE2 may have a shape protruding from the first gate line GL1. As illustrated in FIG. 7, the second gate electrode GE2 is located on the first substrate 301. The second gate electrode GE2 may be a portion of the first gate line GL1. The second gate electrode GE2 and the first gate line GL1 may be unitary (e.g., integrally formed in a monolithic structure).

The second gate electrode GE2 may include a substantially same material and may have a substantially same structure (a multilayer structure) as those of the first gate line GL1. The second gate electrode GE2 and the first gate line GL1 may be substantially simultaneously formed in a substantially same process.

As illustrated in FIG. 2, the third gate electrode GE3 may have a shape protruding from the first gate line GL1. As illustrated in FIG. 8, the third gate electrode GE3 is located on the first substrate 301. The third gate electrode GE3 may be a portion of the first gate line GL1. The third gate electrode GE3 and the first gate line GL1 may be unitary (e.g., integrally formed in a monolithic structure).

The third gate electrode GE3 may include a substantially same material and may have a substantially same structure (a multilayer structure) as those of the first gate line GL1. The third gate electrode GE3 and the first gate line GL1 may be substantially simultaneously formed in a substantially same process.

As illustrated in FIGS. 6, 7, 8, 9 and 10, the gate insulating layer 311 is located on the first gate line GL1, the first gate electrode GE1, the second gate electrode GE2 and the third gate electrode GE3. In such an exemplary embodiment, the gate insulating layer 311 is located over an entire surface of the first substrate 301 including the first gate line GL1, the first gate electrode GE1, the second gate electrode GE2 and the third gate electrode GE3. The gate insulating layer 311 may include silicon nitride (SiNx), silicon oxide (SiOx), or the like. The gate insulating layer 311 may have a multilayer structure including at least two insulating layers having different physical properties.

As illustrated in FIGS. 2 and 6, the first semiconductor layer 321 overlaps the first gate electrode GE1, the first source electrode SE1 and the first drain electrode DEL As illustrated in FIG. 6, the first semiconductor layer 321 is located on the gate insulating layer 311. The first semiconductor layer 321 may include amorphous silicon, polycrystalline silicon, or the like.

As illustrated in FIGS. 2 and 7, the second semiconductor layer 322 overlaps the second gate electrode GE2, the second source electrode SE2 and the second drain electrode DE2. As illustrated in FIG. 7, the second semiconductor layer 322 is located on the gate insulating layer 311. The second semiconductor layer 322 may include a material substantially the same as a material included in the first semiconductor layer 321. The second semiconductor layer 322 and the first semiconductor layer 321 may be substantially simultaneously formed in a substantially same process.

As illustrated in FIGS. 2 and 8, the third semiconductor layer 323 overlaps the third gate electrode GE3, the third source electrode SE3 and the third drain electrode DE3. As illustrated in FIG. 8, the third semiconductor layer 323 is located on the gate insulating layer 311. The third semiconductor layer 323 may include a material substantially the same as a material included in the first semiconductor layer 321. The third semiconductor layer 323 and the first semiconductor layer 321 may be substantially simultaneously formed in a substantially same process.

As illustrated in FIG. 2, the first data line DL1, the second data line DL2 and the third data line DL3 extend in a direction parallel to a Y axis (hereinafter, "a Y-axis direction"). The Y axis crosses the X axis. For example, the Y axis may cross the X axis perpendicularly. The third data line DL3 is located between the first data line DL1 and the second data line DL2. As illustrated in FIG. 2, each of the first data line DL1, the second data line DL2 and the third data line DL3 crosses the first gate line GL1.

Although not illustrated, a portion of the first data line DL1 crossing the first gate line GL1 may have a line width less than a line width of another portion of the first data line DL1. In such an exemplary embodiment, the line width of the first data line DL1 means a width of the first data line DL1 measured in the X-axis direction. Similarly, a portion of the second data line DL2 crossing the first gate line GL1 may have a line width less than a line width of another portion of the second data line DL2. Similarly, the third data line DL3 crossing the first gate line GL1 may have a line width less than a line width of another portion of the third data line DL3. Accordingly, a parasitic capacitance between the data lines (e.g., the first, second and third data lines DL1, DL2 and DL3) and the gate line GL1 may be reduced.

Although not illustrated, an end portion of the first data line DL1 may have an area larger than an area of another portion of the first data line DL1 for connection to another layer or an external driving circuit. Similarly, an end portion of the second data line DL2 may have an area larger than an area of another portion of the second data line DL2 for connection to another layer or an external driving circuit. Similarly, an end portion of the third data line DL3 may have an area larger than an area of another portion of the third data line DL3 for connection to another layer or an external driving circuit.

As illustrated in FIG. 9, each of the first data line DL1, the second data line DL2 and the third data line DL3 is located on the gate insulating layer 311.

The first data line DL1 may include a refractory metal, such as molybdenum, chromium, tantalum and titanium, or an alloy thereof. The first data line DL1 may have a multilayer structure including a refractory metal layer and a low resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an exemplary embodiment, the first data line DL1 may include any suitable metals or conductors rather than the aforementioned materials.

The second data line DL2 and the third data line DL3 may include a substantially same material and may have a substantially same structure (a multilayer structure) as those of the first data line DL1. The second data line DL2, the third data line DL3 and the first data line DL1 may be substantially simultaneously formed in a substantially same process.

As illustrated in FIGS. 2 and 6, the first source electrode SE1 overlaps the first gate electrode GE1 and the first semiconductor layer 321. In addition, as illustrated in FIG. 6, the first source electrode SE1 is located on the gate insulating layer 311 and the first semiconductor layer 321.

The first source electrode SE1 may have a shape protruding from the first data line DL1 toward the first drain electrode DEL The first source electrode SE1 may be a portion of the first data line DL1. The first source electrode SE1 and the first data line DL1 may be unitary (e.g., integrally formed in a monolithic structure).

The first source electrode SE1 may include a substantially same material and may have a substantially same structure (a multilayer structure) as those of the first data line DL1. The first source electrode SE1 and the first data line DL1 may be substantially simultaneously formed in a substantially same process.

As illustrated in FIGS. 2 and 6, the first drain electrode DE1, spaced apart from the first source electrode SE1 at a predetermined distance, is located on the gate insulating layer 311 and the first semiconductor layer 321. The first drain electrode DE1 overlaps the first semiconductor layer 321 and the first gate electrode GE1. A channel area of the first switching element TFT1 is located at a portion of the first semiconductor layer 321 between the first drain electrode DE1 and the first source electrode SE1.

The first drain electrode DE1 may include a substantially same material and may have a substantially same structure (a multilayer structure) as those of the first data line DL1. The first drain electrode DE1 and the first data line DL1 may be substantially simultaneously formed in a substantially same process.

As illustrated in FIGS. 2 and 7, the second source electrode SE2 overlaps the second gate electrode GE2 and the second semiconductor layer 322. As illustrated in FIG. 7, the second source electrode SE2 is located on the gate insulating layer 311 and the second semiconductor layer 322.

The second source electrode SE2 may have a shape protruding from the second data line DL2 toward the second drain electrode DE2. The second source electrode SE2 may be a portion of the second data line DL2. The second source electrode SE2 and the second data line DL2 may be unitary (e.g., integrally formed in a monolithic structure).

The second source electrode SE2 may include a substantially same material and may have a substantially same structure (a multilayer structure) as those of the first data line DL1. The second source electrode SE2 and the first data line DL1 may be substantially simultaneously formed in a substantially same process.

As illustrated in FIGS. 2 and 7, the second drain electrode DE2, spaced apart from the second source electrode SE2 at a predetermined distance, is disposed on the gate insulating layer 311 and the second semiconductor layer 322. The second drain electrode DE2 overlaps the second semiconductor layer 322 and the second gate electrode GE2. A channel area of the second switching element TFT2 is positioned at a portion of the second semiconductor layer 322 between the second drain electrode DE2 and the second source electrode SE2.

The second drain electrode DE2 may include a substantially same material and may have a substantially same structure (a multilayer structure) as those of the first data line DL1. The second drain electrode DE2 and the first data line DL1 may be substantially simultaneously formed in a substantially same process.

As illustrated in FIGS. 2 and 8, the third source electrode SE3 overlaps the third gate electrode GE3 and the third semiconductor layer 323. In addition, as illustrated in FIG. 8, the third source electrode SE3 is disposed on the gate insulating layer 311 and the third semiconductor layer 323.

The third source electrode SE3 may have a shape protruding from the third data line DL3 toward the third gate electrode GE3. The third source electrode SE3 may be a portion of the third data line DL3. The third source electrode SE3 and the third data line DL3 may be unitary (e.g., integrally formed in a monolithic structure).

The third source electrode SE3 may include a substantially same material and may have a substantially same structure (a multilayer structure) as those of the first data line DL1. The third source electrode SE3 and the first data line DL1 may be substantially simultaneously formed in a substantially same process.

As illustrated in FIGS. 2 and 8, the third drain electrode DE3, spaced apart from the third source electrode SE3 at a predetermined distance, is located on the gate insulating layer 311 and the third semiconductor layer 323. The third drain electrode DE3 overlaps the third semiconductor layer 323 and the third gate electrode GE3. A channel area of the third switching element TFT3 is positioned at a portion of the third semiconductor layer 323 between the third drain electrode DE3 and the third source electrode SE3.

The third drain electrode DE3 may include a substantially same material and may have a substantially same structure (a multilayer structure) as those of the first data line DL1. The third drain electrode DE3 and the first data line DL1 may be substantially simultaneously formed in a substantially same process.

A first ohmic contact layer 321a is located between the first semiconductor layer 321 and the first source electrode SE1. The first ohmic contact layer 321a lowers an interfacial resistance between the first semiconductor layer 321 and the first source electrode SE1.

The first ohmic contact layer 321a may include silicide or n+ hydrogenated amorphous silicon doped with n-type impurity ions, e.g., phosphorus (P) or phosphine ($PH_3$), at high concentration.

A second ohmic contact layer 321b is located between the first semiconductor layer 321 and the first drain electrode DE1. The second ohmic contact layer 321b lowers an interfacial resistance between the first semiconductor layer 321 and the first drain electrode DE1. The second ohmic contact layer 321b may include a substantially same material and may have a substantially same structure (a multilayer structure) as those of the first ohmic contact layer 321a. The second ohmic contact layer 321b and the first ohmic contact layer 321a may be substantially simultaneously formed in a substantially same process.

A third ohmic contact layer 322a is located between the second semiconductor layer 322 and the second source electrode SE2. The third ohmic contact layer 322a lowers an interfacial resistance between the second semiconductor layer 322 and the second source electrode SE2. The third ohmic contact layer 322a may include a substantially same material and may have a substantially same structure (a multilayer structure) as those of the first ohmic contact layer 321a. The third ohmic contact layer 322a and the first ohmic contact layer 321a may be substantially simultaneously formed in a substantially same process.

A fourth ohmic contact layer 322b is located between the second semiconductor layer 322 and the second drain electrode DE2. The fourth ohmic contact layer 322b lowers an interfacial resistance between the second semiconductor layer 322 and the second drain electrode DE2. The fourth ohmic contact layer 322b may include a substantially same material and may have a substantially same structure (a multilayer structure) as those of the first ohmic contact layer 321a. The fourth ohmic contact layer 322b and the first ohmic contact layer 321a may be substantially simultaneously formed in a substantially same process.

A fifth ohmic contact layer 323a is located between the third semiconductor layer 323 and the third source electrode SE3. The fifth ohmic contact layer 323a lowers an interfacial resistance between the third semiconductor layer 323 and the third source electrode SE3. The fifth ohmic contact layer 323a may include a substantially same material and may have a substantially same structure (a multilayer structure) as those of the first ohmic contact layer 321a. The fifth ohmic contact layer 323a and the first ohmic contact layer 321a may be substantially simultaneously formed in a substantially same process.

A sixth ohmic contact layer 323b is located between the third semiconductor layer 323 and the third drain electrode DE3. The sixth ohmic contact layer 323b lowers an interfacial resistance between the third semiconductor layer 323 and the third drain electrode DE3. The sixth ohmic contact layer 323b may include a substantially same material and may have a substantially same structure (a multilayer structure) as those of the first ohmic contact layer 321a. The sixth ohmic contact layer 323b and the first ohmic contact layer 321a may be substantially simultaneously formed in a substantially same process.

Although not illustrated, a semiconductor layer (hereinafter, "a first additional semiconductor layer") may be further disposed between the gate insulating layer 311 and the first source electrode SE1. In addition, a semiconductor layer (hereinafter, "a second additional semiconductor layer") may be further disposed between the gate insulating layer 311 and the first drain electrode DEL In addition, a semiconductor layer (hereinafter, "a third additional semiconductor layer") may be further disposed between the gate insulating layer 311 and the second source electrode SE2. In addition, a semiconductor layer (hereinafter, "a fourth additional semiconductor layer") may be further disposed between the gate insulating layer 311 and the second drain electrode DE2. In addition, a semiconductor layer (hereinafter, "a fifth additional semiconductor layer") may be further disposed between the gate insulating layer 311 and the third source electrode SE3. In addition, a semiconductor layer (hereinafter, "a sixth additional semiconductor layer") may be further disposed between the gate insulating layer 311 and the third drain electrode DE3. In addition, a semiconductor layer (hereinafter, "a seventh additional semiconductor layer") may be further disposed between the gate insulating layer 311 and the first data line DL1. In addition, a semiconductor layer (hereinafter, "an eighth additional semiconductor layer") may be further disposed between the gate insulating layer 311 and the second data line DL2.

In addition, although not illustrated, an ohmic contact layer may be further disposed between the first additional semiconductor layer and the first source electrode SE1. In addition, an ohmic contact layer may be further disposed between the second additional semiconductor layer and the first drain electrode DEL In addition, an ohmic contact layer may be further disposed between the third additional semiconductor layer and the second source electrode SE2. In addition, an ohmic contact layer may be further disposed between the fourth additional semiconductor layer and the second drain electrode DE2. In addition, an ohmic contact layer may be further disposed between the fifth additional semiconductor layer and the third source electrode SE3. In addition, an ohmic contact layer may be further disposed between the sixth additional semiconductor layer and the third drain electrode DE3. In addition, an ohmic contact layer may be further disposed between the seventh additional semiconductor layer and the first data line DL1. In addition, an ohmic contact layer may be further disposed between the eighth additional semiconductor layer and the second data line DL2.

As illustrated in FIGS. 6, 7, 8, 9 and 10, the protection layer 320 is disposed on the gate insulating layer 311, the first data line DL1, the second data line DL2, the third data line DL3, the first source electrode SE1, the second source electrode SE2, the third source electrode SE3, the first drain electrode DE1, the second drain electrode DE2 and the third drain electrode DE3. In such an exemplary embodiment, the protection layer 320 is located over an entire surface of the first substrate 301 including over the gate insulating layer 311, the first data line DL1, the second data line DL2, the first source electrode SE1, the second source electrode SE2, the third source electrode SE3, the first drain electrode DE1, the second drain electrode DE2 and the third drain electrode DE3. A surface of the protection layer 320 facing toward the second substrate 302 is flat.

The protection layer 320 has a first drain contact hole 11, a second drain contact hole 12 and a third drain contact hole 13 passing through the protection layer 320. The first drain contact hole 11 is defined corresponding to the first drain electrode DE1, the second drain contact hole 12 is defined corresponding to the second drain electrode DE2, and the third drain contact hole 13 is defined corresponding to the third drain electrode DE3.

The protection layer 320 may include an inorganic insulating material such as silicon nitride ($SiN_x$) or silicon oxide ($SiO_x$), and in such an exemplary embodiment, an inorganic insulating material having photosensitivity and a dielectric constant of about 4.0 may be used. In an exemplary embodiment, the protection layer 320 may have a double-layer structure including a lower inorganic layer and an upper organic layer. The protection layer 320 may have a thickness greater than or equal to about 5000 Å, e.g., in a range of about 6000 Å to about 8000 Å.

As illustrated in FIG. 2, the first pixel electrode PE1 is located adjacent to the first gate line GL1 and the first data line DL1. The first pixel electrode PE1 is located at the first quadrant. In the case where the aforementioned reference data line is the third data line DL3, the first pixel electrode PE1 does not overlap the third data line DL3 and the second data line DL2. On the other hand, the first pixel electrode PE1 may or may not overlap the first data line DL1 adjacent to the first pixel electrode PE1.

The first pixel electrode PE1 is connected to the first switching element TFT1. For example, the first pixel electrode PE1 is connected to the first switching element TFT1 through a first connection electrode 551 protruding from the first pixel electrode PE1. As a detailed example, as illustrated in FIG. 6, the first pixel electrode PE1 is connected to the first drain electrode DE1 of the first switching element TFT1 through the first connection electrode 551 and the first drain contact hole 11 of the protection layer 320.

The first pixel electrode PE1 may include a transparent conductive material such as indium tin oxide (ITO) or indium zinc oxide (IZO). In such an exemplary embodiment, ITO may be a polycrystalline or monocrystalline material, and IZO may be a polycrystalline or monocrystalline material as well. Alternatively, IZO may be an amorphous material.

The first connection electrode 551 and the first pixel electrode PE1 may be unitary (e.g., integrally formed in a monolithic structure). The first connecting electrode 551 may include a substantially same material and may have a substantially same structure (a multilayer structure) as those of the first pixel electrode PE1. The first connection electrode 551 and the first pixel electrode PE1 may be substantially simultaneously formed in a substantially same process.

As illustrated in FIG. 2, the second pixel electrode PE2 is located adjacent to the first gate line GL1 and the second data line DL2. The second pixel electrode PE2 is located at the second quadrant. In the case where the aforementioned reference data line is the third data line DL3, the second pixel electrode PE2 does not overlap the third data line DL3 and the first data line DL1. On the other hand, the second pixel electrode PE2 may or may not overlap the second data line DL2 adjacent to the second pixel electrode PE2.

The second pixel electrode PE2 is connected to the second switching element TFT2. For example, the second pixel electrode PE2 is connected to the second switching element TFT2 through a second connection electrode 552 protruding from the second pixel electrode PE2. As a detailed example, as illustrated in FIG. 7, the second pixel electrode PE2 is connected to the second drain electrode DE2 of the second switching element TFT2 through the second connection electrode 552 and the second drain contact hole 12 of the protection layer 320.

The second pixel electrode PE2 may include a substantially same material and may have a substantially same structure (a multilayer structure) as those of the first pixel electrode PE1. The second connection electrode 552 and the first pixel electrode PE1 may be substantially simultaneously formed in a substantially same process.

The second connection electrode 552 and the second pixel electrode PE2 may be unitary (e.g., integrally formed in a monolithic structure). The second connecting electrode 552 may include a substantially same material and may have a substantially same structure (a multilayer structure) as those of the first pixel electrode PE1. The second connection electrode 552 and the first pixel electrode PE1 may be substantially simultaneously formed in a substantially same process.

As illustrated in FIG. 2, the third pixel electrode PE3 includes a first divided pixel electrode PE3a and a second divided pixel electrode PE3b.

As illustrated in FIG. 2, the first divided pixel electrode PE3a is located adjacent to the first gate line GL1 and the first data line DL1. The first divided pixel electrode PE3a is located at the third quadrant. In the case where the aforementioned reference data line is the third data line DL3, the first divided pixel electrode PE3a does not overlap the third data line DL3 and the second data line DL2. On the other hand, the first divided pixel electrode PE3a may or may not overlap the first data line DL1 adjacent to the first divided pixel electrode PE3a.

The first divided pixel electrode PE3a is connected to the third switching element TFT3. For example, the first divided pixel electrode PE3a is connected to the third switching element TFT3 through a third connection electrode 553 protruding from first divided pixel electrode PE3a. As a more detailed example, the first divided pixel electrode PE3a is connected to the third drain electrode DE3 of the third switching element TFT3 through the third connection electrode 553 and the third drain contact hole 13 of the protection layer 320.

The first divided pixel electrode PE3a may include a substantially same material and may have a substantially same structure (a multilayer structure) as those of the aforementioned first pixel electrode PE1. The first divided pixel electrode PE3a and the first pixel electrode PE1 may be substantially simultaneously formed in a substantially same process.

The third connection electrode 553, the first divided pixel electrode PE3a and the second divided pixel electrode PE3b may be unitary (e.g., integrally formed in a monolithic structure). The third connection electrode 553 may include a substantially same material and may have a substantially same structure (a multilayer structure) as those of the aforementioned first pixel electrode PE1. The third connection electrode 553 and the first pixel electrode PE1 may be substantially simultaneously formed in a substantially same process.

As illustrated in FIG. 2, the second divided pixel electrode PE3*b* is located adjacent to the first gate line GL1 and the second data line DL2. The second divided pixel electrode PE3*b* is located at the fourth quadrant. In the case where the aforementioned reference data line is the third data line DL3, the second divided pixel electrode PE3*b* does not overlap the third data line DL3 and the first data line DL1. On the other hand, the second divided pixel electrode PE3*b* may or may not overlap the second data line DL2 adjacent to the second divided pixel electrode PE3*b*.

The second divided pixel electrode PE3*b* is connected to the third switching element TFT3. For example, the second divided pixel electrode PE3*b* is connected to the third switching element TFT3 through the third connection electrode 553 described above. As a more detailed example, as illustrated in FIG. 8, the second divided pixel electrode PE3*b* is connected to the third drain electrode DE3 of the third switching element TFT3 through the third connection electrode 553 and the third drain contact hole 13 of the protection layer 320. The second divided pixel electrode PE3*b* and the first divided pixel electrode PE3*a* may be unitary (e.g., integrally formed in a monolithic structure).

The second divided pixel electrode PE3*b* may include a substantially same material and may have a substantially same structure (a multilayer structure) as those of the aforementioned first pixel electrode PE1. The second divided pixel electrode PE3*b* and the first pixel electrode PE1 may be substantially simultaneously formed in a substantially same process.

As illustrated in FIG. 2, from a plan view, at least two of the first pixel electrode PE1, the second pixel electrode PE2 and the third pixel electrode PE3 included in the unit pixel UPX may have different sizes.

For example, in the case where the first pixel electrode PE1 is a pixel electrode included in a red pixel, the second pixel electrode PE2 is a pixel electrode included in a green pixel, and the third pixel electrode PE3 is a pixel electrode included in a blue pixel, the first pixel electrode PE1 may have a size less than a size of the second pixel electrode PE2, and the third pixel electrode PE3 may have a size less than a size of the second pixel electrode PE2. In such an exemplary embodiment, the first divided pixel electrode PE3*a* adjacent to the first pixel electrode PE1 may have a size less than a size of the second divided pixel electrode PE3*b* adjacent to the second pixel electrode PE2.

As another example, in the case where the first pixel electrode PE1, the second pixel electrode PE2 and the third pixel electrode PE3 are included in the red pixel, the green pixel, and the blue pixel, respectively, as described above, the second pixel electrode PE2 may have a size less than a size of the first pixel electrode PE1 and the third pixel electrode PE3 may have a size less than a size of the second pixel electrode PE2. In such an exemplary embodiment, the second divided pixel electrode PE3*b* adjacent to the second pixel electrode PE2 may have a size less than a size of the first divided pixel electrode PE3*a* adjacent to the first pixel electrode PE1.

As another example, in the case where the first pixel electrode PE1, the second pixel electrode PE2 and the third pixel electrode PE3 are included in the red pixel, the green pixel and the blue pixel, respectively, as described above, the first pixel electrode PE1 may have a size substantially equal to a size of the second pixel electrode PE2 and the third pixel electrode PE3 may have a size less than a size of the first pixel electrode PE1. In such an exemplary embodiment, the first divided pixel electrode PE3*a* may have a size substantially equal to a size of the second divided pixel electrode PE3*b*.

As illustrated in FIG. 2, a distance D1 between the first pixel electrode PE1 and the second pixel electrode PE2 included in one unit pixel UPX may be substantially equal to a distance D2 between the first divided pixel electrode PE3*a* and the second divided pixel electrode PE3*b* included in the unit pixel UPX.

As illustrated in FIGS. 6, 7, 8, 9 and 10, the first light blocking layer 371 is located on the protection layer 320. In addition, the first light blocking layer 371 is further located on a portion of the first pixel electrode PE1, a portion of the second pixel electrode PE2, a portion of the first divided pixel electrode PE3*a* and a portion of the second divided pixel electrode PE3*b*. For example, the first light blocking layer 371 is located on facing edge portions of the first pixel electrode PE1 and the second pixel electrode PE2. Further, the first light blocking layer 371 is located on facing edge portions of the first divided pixel electrode PE3*a* and the second divided pixel electrode PE3*b*. In addition, the first light blocking layer 371 is located on facing edge portions of the first pixel electrode PE1 and the first divided pixel electrode PE3*a*. In addition, the first light blocking layer 371 is located on facing edge portions of the second pixel electrode PE2 and the second divided pixel electrode PE3*b*. In addition, the first light blocking layer 371 is located between the first pixel electrode PE1 and the second pixel electrode PE2, between the first divided pixel electrode PE3*a* and the second divided pixel electrode PE3*b*, between the first pixel electrode PE1 and the first divided pixel electrode PE3*a* and between the second pixel electrode PE2 and the second divided pixel electrode PE3*b*. In an exemplary embodiment, in the case where a portion of the first light blocking layer 371 between the first pixel electrode PE1 and the second pixel electrode PE2 is defined as a first light blocking portion, and a portion of the first light blocking layer 371 between the first divided pixel electrode PE3*a* and the second divided pixel electrodes PE3*b* is defined as a second light blocking portion, the first light blocking layer 371 is further located between the first light blocking portion and the second light blocking portion.

As illustrated in FIG. 6, the column spacer 472 is located on the first light blocking layer 371. The column spacer 472 and the first light blocking layer 371 may be unitary (e.g., integrally formed in a monolithic structure). The column spacer 472 may include a substantially same material and may have a substantially same structure as those of the aforementioned first light blocking layer 371. The column spacer 472 and the first light blocking layer 371 may be substantially simultaneously formed in a substantially same process.

As illustrated in FIGS. 6, 7, 8, 9 and 10, a polarization plate 381 is located between the first substrate 301 and a backlight unit 444.

When a surface of the first substrate 110 and a surface of the second substrate 302 that face each other are defined as inner surfaces of the corresponding substrates, respectively, and surfaces opposite to the inner surfaces are defined as outer surfaces of the corresponding substrates, respectively, the polarization plate 381 may be located on the outer surface of the first substrate 301.

The first color layer 351, the second color layer 352 and the third color layer 353 included in each unit pixel are adjacent to each other with respect to the gate line and the data line as a boundary. For example, the first color layer 351, the second color layer 352 and the third color layer 353 included in one unit pixel UPX are adjacent to each other with the first gate line GL1, the first data line DL1, the second data line DL2 and the third data line DL3 as a boundary.

Of the first, second and third color layers 351, 352 and 353 included in one unit pixel UPX, the first color layer 351 and the second color layer 352 face each other, having at least one data line therebetween. In other words, the first color layer 351 and the second color layer 352 are located adjacent to each other with at least one data line therebetween. For example, the first color layer 351 and the second color layer 352 of the unit pixel UPX are located adjacent to each other, having the first data line DL1, the second data line DL2 and the third data line DL3 therebetween. At least a portion of the first data line DL1, at least a portion of the second data line DL2 and at least a portion of the third data line DL3 are located between the first color layer 351 and the second color layer 352.

Of the first, second and third pixels PX3 included in one unit pixel UPX, the third color layer 353 faces the first color layer 351 and the second color layer 352 with a gate line therebetween. In other words, a portion of the third color layer 353 and the first color layer 351 are located adjacent to each other with the gate line therebetween, and another portion of the third color layer 353 and the second color layer 352 are located adjacent to each other with the gate line therebetween. For example, a first divided color layer 353a of the third color layer 353 and the first color layer 351 included in one unit pixel UPX are located adjacent to each other with the first gate line GL1 therebetween, and a second divided color layer 353b of the third color layer 353 and the second color layer 352 included in said unit pixel UPX are located adjacent to each other with the first gate line GL1 therebetween.

As illustrated in FIG. 2, the first color layer 351 and the second color layer 352 of the unit pixel UPX are arranged along the X-axis direction. The second color layer 352 is adjacent to the first color layer 351 in the X-axis direction.

The first divided color layer 353a and the second divided color layer 353b of the unit pixel UPX are arranged along the X-axis direction. The second divided color layer 353b is adjacent to the first divided color layer 353a in the X-axis direction. In such an exemplary embodiment, the first divided color layer 353a and the second divided color layer 353b are arranged along the X-axis direction so as not to cross or overlap the first color layer 351 and the second color layer 352.

The first color layer 351 and the first divided color layer 353a of the unit pixel UPX are arranged along the Y-axis direction. The first divided color layer 353a is adjacent to the first color layer 351 in the Y-axis direction and adjacent to the second divided color layer 353b in the X-axis direction.

The second color layer 352 and the second divided color layer 353b of the unit pixel UPX are arranged along the Y-axis direction. The second divided color layer 353b is adjacent to the second color layer 352 in the Y-axis direction and adjacent to the first divided color layer 353a in the X-axis direction. In such an exemplary embodiment, the second color layer 352 and the second divided color layer 353b are arranged along the Y-axis direction so as not to cross or overlap the first color layer 351 and the first divided color layer 353a.

As illustrated in FIG. 2, the first color layer 351 is located adjacent to the first gate line GL1 and the first data line DL1. The first color layer 351 is located at the first quadrant. The first color layer 351 is located corresponding to the first pixel electrode PE1 at the first quadrant. As illustrated in FIG. 6, the first color layer 351 is located on the second substrate 302.

As illustrated in FIG. 6, the first color layer 351 may include a first color filter layer 411 and a first color conversion layer 412.

The first color filter layer 411 is located between the second substrate 302 and the first color conversion layer 412.

The first color conversion layer 412 is located on the first color filter layer 411. In other words, the first color conversion layer 412 is located between the first color filter layer 411 and the first substrate 301. As a more detailed example, the first color conversion layer 412 may be located between the first color filter layer 411 and the dichroic reflection layer 388. The first color conversion layer 412 and the first color filter layer 411 may have a substantially same shape on a plane.

The first color conversion layer 412 converts a color of a light L emitted from the backlight unit 444. To this end, the first color conversion layer 412 converts a wavelength of the light L emitted from the backlight unit 444. The first color conversion layer 412 may include, for example, quantum dot particles. In addition, the first color conversion layer 412 may further include at least one of metal elements based on: sulfide, silicon (Si), and/or nitride.

The quantum dot particle converts the wavelength of a light to emit a desired specific light. The wavelength of the light emitted from the first color conversion layer 412 varies depending on the size of the quantum dot particle. In other words, the color of light emitted from the first color conversion layer 412 varies depending on a diameter of the quantum dot.

The quantum dot particle may have a diameter of about 2 nm or more and about 10 nm or less. In general, in the case where the quantum dot particle has a small diameter, the wavelength of the output light is shortened and a blue-based light is output. On the other hand, in the case where the diameter of the quantum dot particle increases, the wavelength of the output light is lengthened and a red-based light is output. For example, a quantum dot particle having a diameter of about 10 nm may output a red light, a quantum dot particle having a diameter of about 7 nm may output a green light, and a quantum dot particle having a diameter of about 5 nm may output a blue light.

The quantum dot particle may have a dual structure including of an inner core and an outer shell surrounding the inner core. As a more detailed example, the quantum dot particle including a CdSe/ZnS material includes an inner core including CdSe and an outer shell including ZnS.

Alternatively, the first color conversion layer 412 may include quantum rod particles instead of the quantum dot particles described above.

In the case where the first pixel PX1 is a red pixel that emits a red light, the first color conversion layer 412 of the first pixel PX1 may be a red conversion layer that emits a red light. In such an exemplary embodiment, the first color conversion layer 412 converts the light from the backlight unit 444 into a red light. Herein, the light from the backlight unit 444 may be a white light or a blue light.

The light L from the backlight unit 444 passes through the first color conversion layer 412 to reach the first color filter layer 411, and the first color filter layer 411 blocks a blue light having passed through the first color conversion layer 412 without being converted into red. In the case where the first color conversion layer 412 is a red conversion layer as described above, the first color filter layer 411 may be a red color filter layer having a red color.

On the other hand, in the case where the aforementioned backlight unit 444 emits a blue light, a first blue cut filter (not illustrated) may be further located between the first color conversion layer 412 (i.e., a red conversion layer) and the first color filter layer 411 (i.e., a red color filter layer) so as to improve the effects of blocking the blue light. The first blue cut filter is located between the first color conversion layer 412 and the first color filter layer 411. The first blue cut filter blocks a blue light that has not been converted into red at the first color conversion layer 412 and passed through the first color conversion layer 412. The first blue cut filter may have a refractive index greater than that of the first color conversion layer 412 and less than that of the first color filter layer 411. An air layer may be used as the first blue cut filter.

As illustrated in FIG. 2, the second color layer 352 is located adjacent to the first gate line GL1 and the second data line DL2. The second color layer 352 is located at the second quadrant. The second color layer 352 is located corresponding to the second pixel electrode PE2 at the second quadrant. As illustrated in FIG. 7, the second color layer 352 is located on the second substrate 302.

As illustrated in FIG. 7, the second color layer 352 may include a second color filter layer 421 and a second color conversion layer 422.

The second color filter layer 421 is located between the second substrate 302 and the second color conversion layer 422.

The second color conversion layer 422 is located on the second color filter layer 421. In other words, the second color conversion layer 422 is located between the second color filter layer 421 and the first substrate 301. As a more detailed example, the second color conversion layer 422 may be located between the second color filter layer 421 and the dichroic reflection layer 388. The second color conversion layer 422 and the second color filter layer 421 may have a substantially same shape on a plane.

The second color conversion layer 422 converts the color of the light L emitted from the backlight unit 444. To this end, the second color conversion layer 422 converts the wavelength of the light L emitted from the backlight unit 444. The second color conversion layer 422 may include, for example, a material substantially the same as a material included in the first color conversion layer 412. However, a size of quantum dots (or quantum rods) included in the second color conversion layer 422 may be different from a size of the quantum dots (or the quantum rods) included in the first color conversion layer 412. For example, the size of the quantum dots (or the quantum rods) included in the second color conversion layer 422 may be less than the size of the quantum dots (or the quantum rods) included in the first color conversion layer 412.

In the case where the second pixel PX2 is a green pixel that emits a green light, the second color conversion layer 422 of the second pixel PX2 may be a green conversion layer that emits a green light. In such an exemplary embodiment, the second color conversion layer 422 converts the light from the backlight unit 444 into a green light. Herein, the light from the backlight unit 444 may be a white light or a blue light.

The light L from the backlight unit 444 passes through the second color conversion layer 422 to reach the second color filter layer 421, and the second color filter layer 421 blocks a blue light having passed through the second color conversion layer 422 without being converted into green. In the case where the second color conversion layer 422 is a green conversion layer as described above, the second color filter layer 421 may be a green color filter layer having a green color.

In an exemplary embodiment, in the case where the aforementioned backlight unit 444 emits a blue light, a second blue cut filter (not illustrated) may be further located between the second color conversion layer 422 (i.e., a green conversion layer) and the second color filter layer 421 (i.e., a green color filter layer) so as to improve the effects of blocking the blue light. The second blue cut filter is located between the second color conversion layer 422 and the second color filter layer 421. The second blue cut filter blocks a blue light that has not been converted into green at the second color conversion layer 422 and passed through the second color conversion layer 422. The second blue cut filter may have a refractive index greater than that of the second color conversion layer 422 and less than that of the second color filter layer 421. An air layer may be used as the second blue cut filter. The second blue cut filter may include a material substantially the same as a material included in the first blue cut filter.

As illustrated in FIG. 2, the third color layer 353 includes the first divided color layer 353*a* and the second divided color layer 353*b*.

As illustrated in FIG. 2, the first divided color layer 353*a* is located adjacent to the first gate line GL1 and the first data line DL1. The first divided color layer 353*a* is located at the third quadrant. The first divided color layer 353*a* is located corresponding to the first divided pixel electrode PE3*a* at the third quadrant. As illustrated in FIG. 8, the first divided color layer 353*a* is located on the second substrate 302.

The first divided color layer 353*a* may include a light transmitting layer. For example, in the case where the aforementioned backlight unit emits a blue light, the first divided color layer 353*a* may be a light transmitting layer. The light transmitting layer transmits the blue light emitted from the backlight unit 444 as it is without a substantial change of the color (or the wavelength). The light transmitting layer may include, for example, a transparent photoresist. In an exemplary embodiment, the light transmitting layer may further include a light scattering agent. Titanium dioxide ($TiO_2$) may be used as the light scattering agent.

As illustrated in FIG. 8, the first divided color layer 353*a* is located on the second substrate 302. In other words, the first divided color layer 353*a* is located between the first substrate 301 and the second substrate 302. As a more detailed example, the first divided color layer 353*a* may be located between the second substrate 302 and the dichroic reflection layer 388.

In an exemplary embodiment, the first divided color layer 353*a* may have a substantially same structure as that of the aforementioned first color layer 351. For example, although not illustrated, the first divided color layer 353*a* may include a first divided color filter layer and a first divided color conversion layer. Herein, the first divided color filter layer may be omitted.

The first divided color filter layer is located between the second substrate 302 and the first divided color conversion layer.

The first divided color conversion layer is located on the first divided color filter layer. In other words, the first divided color conversion layer is located between the first divided color filter layer and the first substrate 301. As a more detailed example, the first divided color conversion layer may be located between the first divided color filter layer and the dichroic reflection layer 388. The first divided color conversion layer and the first divided color filter layer may have a substantially same shape on a plane.

The first divided color conversion layer converts the color of the light L emitted from the backlight unit 444. To this end, the first divided color conversion layer converts the wavelength of the light L emitted from the backlight unit 444. The first color conversion layer may include a material substantially the same as a material included in the aforementioned first color conversion layer 412 or a material included in the aforementioned second color conversion layer 422. However, a size of a quantum dot (or a quantum rod) included in the first divided color conversion layer may be different from a size of a quantum dot (or a quantum rod) included in the second color conversion layer 422. For example, the size of the quantum dot (or the quantum rod) included in the first divided color conversion layer may be less than the size of the quantum dot (or the quantum rod) included in the second color conversion layer 422.

In the case where the third pixel PX3 is a blue pixel emitting a blue light, the first divided color conversion layer of the third pixel PX3 may be a blue conversion layer emitting a blue light. In such an exemplary embodiment, the first divided color conversion layer converts the light from the backlight unit 444 into a blue light. Herein, the light from the backlight unit 444 may be a white light or a blue light.

The light L from the backlight unit 444 passes through the first divided color conversion layer to reach the first divided color filter layer. In the case where the first divided color conversion layer is a blue conversion layer as described above, the first divided color filter layer may be a blue color filter layer having a blue color.

As illustrated in FIG. 2, the second divided color layer 353*b* is located adjacent to the first gate line GL1 and the second data line DL2. The second divided color layer 353*b* is located at the fourth quadrant. The second divided color layer 353*b* is located corresponding to the second divided pixel electrode PE3*b* at the fourth quadrant. As illustrated in FIG. 8, the second divided color layer 353*b* is located on the second substrate 302.

The second divided color layer 353*b* may include a light transmitting layer. For example, in the case where the aforementioned backlight unit emits a blue light, the second divided color layer 353*b* may be a light transmitting layer. The light transmitting layer transmits the blue light from the backlight unit 444 as it is without a substantial change of the color (or the wavelength). The light transmitting layer may include, for example, a transparent photoresist. In an exemplary embodiment, the light transmitting layer may further include a light scattering agent. Titanium dioxide ($TiO_2$) may be used as the light scattering agent. The second divided color layer 353*b* may include a material substantially the same as a material included in the first divided color layer 353*a*.

As illustrated in FIG. 8, the second divided color layer 353*b* is located on the second substrate 302. In other words, the second divided color layer 353*b* is located between the first substrate 301 and the second substrate 302. As a more detailed example, the second divided color layer 353*b* may be located between the second substrate 302 and the dichroic reflection layer 388.

In an exemplary embodiment, the second divided color layer 353*b* may have a substantially same structure as that of the first color layer 351 described above. For example, although not illustrated, the second divided color layer 353*b* may include a second divided color filter layer and a second divided color conversion layer. Herein, the second divided color filter layer may be omitted.

The second divided color filter layer is located between the second substrate 302 and the second divided color conversion layer.

The second divided color conversion layer is located on the second divided color filter layer. In other words, the second divided color conversion layer is located between the second divided color filter layer and the first substrate 301. As a more detailed example, the second divided color conversion layer may be located between the second divided color filter layer and the dichroic reflection layer 388. The second divided color conversion layer and the second divided color filter layer may have a substantially same shape on a plane.

The second divided color conversion layer converts the color of the light L emitted from the backlight unit 444. To this end, the second divided color conversion layer converts the wavelength of the light L emitted from the backlight unit 444. The second color conversion layer may include a material substantially the same as a material included in the aforementioned first color conversion layer 412 or a material included in the aforementioned second color conversion layer 422. However, a size of quantum dots (or quantum rods) included in the second divided color conversion layer may be different the size of the quantum dots (or quantum rods) included in the second color conversion layer 422. For example, the size of the quantum dots (or the quantum rods) included in the second divided color conversion layer may be less than the size of the quantum dots (or the quantum rods) included in the second color conversion layer 422.

In the case where the third pixel PX3 is a blue pixel emitting a blue light, the second divided color conversion layer of the third pixel PX3 may be a blue conversion layer emitting a blue light. In such an exemplary embodiment, the second divided color conversion layer converts the light from the backlight unit 444 into a blue light. Herein, the light from the backlight unit 444 may be a white light or a blue light.

The light L from the backlight unit 444 passes through the second divided color conversion layer to reach the second divided color filter layer. In the case where the second divided color conversion layer is a blue conversion layer as described above, the second divided color filter layer may be a blue color filter layer having a blue color.

In an exemplary embodiment, each of the first color filter layer 411, the second color filter layer 421, the first divided color filter layer and the second divided color filter layer described above may be replaced with a yellow photoresist.

As illustrated in FIG. 2, from a plan view, at least two of the first color layer 351, the second color layer 352 and the third color layer 353 included in the unit pixel UPX may have different sizes.

As an example, as illustrated in FIGS. 2 and 4, in the case where the first color layer 351 is a red color layer emitting a red light, the second color layer 352 is a green color layer emitting a green light and the third color layer 353 is a blue color layer emitting a blue light, the first color layer 351 may have a size substantially the same as a size of the second color layer 352, and the third color layer 353 may have a size less than a size of the first color layer 351. In such an exemplary embodiment, the first divided color layer 353*a* have a size substantially the same as a size of the second divided color layer 353*b*.

As another example, in the case where the first color layer 351 emits a red light, the second color layer 352 emits a green light and the third color layer 353 emits a blue light, as described above, the first color layer 351 may have a size less than a size of the second color layer 352, and the third color layer 353 may have a size less than a size of the first color layer 351. In such an exemplary embodiment, the first divided color layer 353a adjacent to the first color layer 351 may have a size less than a size of the second divided color layer 353b adjacent to the second color layer 352.

As still another example, in the case where the first color layer 351 emits a red light, the second color layer 352 emits a green light and the third color layer 353 emits a blue light, as described above, the second color layer 352 may have a size less than a size of the first color layer 351, and the third color layer 353 may have a size less than a size of the second color layer 352. In such an exemplary embodiment, the second divided color layer 353b adjacent to the second color layer 352 may have a size less than a size of the first divided color layer 353a adjacent to the first color layer 351.

The size relationship between the first color layer 351, the second color layer 352 and the third color layer 353 may be substantially the same as that of the first pixel electrode PE1, the second pixel electrode PE2 and the third pixel electrode PE3.

As illustrated in FIG. 4, a distance d1 between the first color layer 351 and the second color layer 352 included in one unit pixel UPX may be substantially equal to a distance d2 between the first divided color layer 353a and the second divided color layer 353b included in the unit pixel UPX.

As illustrated in FIGS. 6, 7, 8, 9 and 10, the second light blocking layer 372 is located on the second substrate 302. The second light blocking layer 372 overlaps a portion of the first pixel electrode PE1, a portion of the second pixel electrode PE2, a portion of the first divided pixel electrode PE3a and a portion of the second divided pixel electrode PE3b. For example, the second light blocking layer 372 overlaps facing edge portions of the first pixel electrode PE1 and the second pixel electrode PE2. Further, the second light blocking layer 372 overlaps facing edge portions of the first divided pixel electrode PE3a and the second divided pixel electrode PE3b. In addition, the second light blocking layer 372 overlaps facing edge portions of the first pixel electrode PE1 and the first divided pixel electrode PE3a. In addition, the second light blocking layer 372 overlaps facing edge portions of the second pixel electrode PE2 and the second divided pixel electrode PE3b. In addition, the second light blocking layer 372 overlaps a portion of the protection layer 320 between the first pixel electrode PE1 and the second pixel electrode PE2, a portion of the protection layer 320 between the first divided pixel electrode PE3a and the second divided pixel electrode PE3b, a portion of the protection layer 320 between the first pixel electrode PE1 and the first divided pixel electrode PE3a and a portion of the protection layer 320 between the second pixel electrode PE2 and the second divided pixel electrode PE3b.

In an exemplary embodiment, as illustrated in FIGS. 3, 4 and 9, the second light blocking layer 372 is located between the first color layer 351 and the second color layer 352. In addition, as illustrated in FIGS. 3, 4 and 10, the second light blocking layer 372 is located between the first divided color layer 353a and the second divided color layer 353b. Herein, a portion of the second light blocking layer 372 between the first color layer 351 and the second color layer 352 is defined as a first light blocking portion 801 and a portion of the second light blocking layer 372 between the first divided color layer 353a and the second divided color layer 353b is defined as a second light blocking portion 802.

In addition, as illustrated in FIGS. 3 and 4, the second light blocking layer 372 is located between the first color layer 351 and the first divided color layer 353a. In addition, as illustrated in FIGS. 3 and 4, the second light blocking layer 372 is located between the second color layer 352 and the second divided color layer 353b. Herein, a portion of the second light blocking layer 372 between the first color layer 351 and the first divided color layer 353a is defined as a third light blocking portion 803 and a portion of the second light blocking layer 372 between the second color layer 352 and the second divided color layer 353b is defined as a fourth light blocking portion 804.

In addition, as illustrated in FIGS. 3 and 4, the second light blocking layer 372 is also located between the first light blocking portion 801 and the second light blocking portion 802. Herein, a portion of the second light blocking layer 372 between the first light blocking portion 801 and the second light blocking portion 802 is defined as a fifth light blocking portion 805.

From a vertical viewpoint, as illustrated in FIG. 9, the first light blocking portion 801 is located between the second substrate 302 and the dichroic reflection layer 388. In such an exemplary embodiment, the first light blocking portion 801 overlaps an area between the first pixel electrode PE1 and the second pixel electrode PE2. In addition, the first light blocking portion 801 overlaps facing edge portions of the first pixel electrode PE1 and the second pixel electrode PE2.

From a vertical viewpoint, as illustrated in FIG. 10, the second light blocking portion 802 is located between the second substrate 302 and the dichroic reflection layer 388. In such an exemplary embodiment, the second light blocking portion 802 overlaps an area between the first divided pixel electrode PE3a and the second divided pixel electrode PE3b. In addition, the second light blocking portion 802 overlaps facing edge portions of the first divided pixel electrode PE3a and the second divided pixel electrode PE3b.

From a vertical viewpoint, each of the third, fourth and fifth light blocking portions 803, 804 and 805 are located between the second substrate 302 and the dichroic reflection layer 388. In such an exemplary embodiment, the third light blocking portion 803 overlaps an area between the first pixel electrode PE1 and the first divided pixel electrode PE3a. In addition, the third light blocking portion 803 overlaps facing edge portions of the first pixel electrode PE1 and the first divided pixel electrode PE3a. Further, the fourth light blocking portion 804 overlaps an area between the second pixel electrode PE2 and the second divided pixel electrode PE3b. In addition, the fourth light blocking portion 804 overlaps facing edge portions of the second pixel electrode PE2 and the second divided pixel electrode PE3b.

As illustrated in FIG. 9, an edge of the first light blocking portion 801 adjacent to the first color layer 351 may be located between the first color layer 351 and the second substrate 302, an edge of the first light blocking portion 801 adjacent to the second color layer 352 may be located between the second color layer 352 and the second substrate 302. As a more detailed example, the edge of the first light blocking portion 801 adjacent to the first color layer 351 may be located between the first color filter layer 411 and the second substrate 302, and the edge of the first light blocking portion 801 adjacent to the second color layer 352 may be located between the second color filter layer 421 and the second substrate 302.

As illustrated in FIG. 10, an edge of the second light blocking portion 802 adjacent to the first divided color layer 353a may be located between the first divided color layer 353a and the second substrate 302, and an edge of the second light blocking portion 802 adjacent to the second divided color layer 353b may be located between the second divided color layer 353b and the second substrate 302.

Although not illustrated, an edge of the third light blocking portion 803 adjacent to the first color layer 351 may be located between the first color layer 351 and the second substrate 302, and an edge of the third light blocking portion 803 adjacent to the first divided color layer 353a may be located between the first divided color layer 353a and the second substrate 302.

Although not illustrated, an edge of the fourth light blocking portion 804 adjacent to the second color layer 352 may be located between the second color layer 352 and the second substrate 302, and an edge of the fourth light blocking portion 804 adjacent to the second divided color layer 353b may be located between the second divided color layer 353b and the second substrate 302.

The first, second, third, fourth and fifth light blocking portions 801, 802, 803, 804 and 805 may be unitary (e.g., integrally formed in a monolithic structure). The first, second, third, fourth and fifth light blocking portions 801, 802, 803, 804 and 805 may include a substantially same material and have a substantially same structure. The first, second, third, fourth and fifth light blocking portions 801, 802, 803, 804 and 805 may be formed substantially simultaneously in a substantially same process.

The first light blocking portion 801 and the second light blocking portion 802, which are unitary, may have a straight line shape, as illustrated in FIG. 4. As a more detailed example, the first light blocking portion 801, the fifth light blocking portion 805, and the second light blocking portion 802, which are integrally formed, may form a straight line parallel to the Y axis. In addition, the third light blocking portion 803, the fifth light blocking portion 805 and the fourth light blocking portion 804, which are integrally formed, may form a straight line parallel to the X axis.

As illustrated in FIGS. 4, 9 and 10, a width W1 of the first light blocking portion 801 may be substantially equal to a width W2 of the second light blocking portion 802. The width W1 of the first light blocking portion 801 means a size of the first light blocking portion 801 measured in the X-axis direction and the width W2 of the second light blocking portion 802 means a size of the second light blocking portion 802 measured in the X-axis direction.

In an exemplary embodiment, as illustrated in FIG. 4, a width W3 of the third light blocking portion 803 may be substantially equal to a width W4 of the fourth light blocking portion 804. The width W3 of the third light blocking portion 803 means a size of the third light blocking portion 803 measured in the Y-axis direction and the width W4 of the fourth light blocking portion 804 means a size of the fourth light blocking portion 804 measured in the Y-axis direction. In such an exemplary embodiment, the width W3 of the third light blocking portion 803 is less than the width W1 of the first light blocking portion 801. Similarly, the width W4 of the fourth light blocking portion 804 is less than the width W1 of the first light blocking portion 801.

In an exemplary embodiment, from a plan view as in FIG. 3, the aforementioned first light blocking layer 371 may have a substantially same shape and a substantially same size as those of the second light blocking layer 372. In such an exemplary embodiment, the second light blocking layer 372 overlaps the entire portion of the first light blocking layer 371.

As illustrated in FIGS. 6, 7, 8, 9 and 10, the dichroic reflection layer 388 is located on the first color layer 351, the second color layer 352, the first divided color layer 353a, the second divided color layer 353b and the second substrate 302. The dichroic reflection layer 388 may be located over an entire surface of the second substrate 302 including the first color layer 351, the second color layer 352, the first divided color layer 353a and the second divided color layer 353b.

The dichroic reflection layer 388 includes a dichroic filter. The dichroic filter is a filter which transmits a light having a predetermined wavelength among the incident light and reflects a light having a wavelength other than the predetermined wavelength.

In the case where the light from the backlight unit 444 is a blue light, the dichroic reflection layer 388 transmits the blue light and reflects a light other than blue light. That is, the blue light from the backlight unit 444 passes through the dichroic reflection layer 388. On the other hand, a red light and a green light having been converted by the first color conversion layer 412 and the second color conversion layer 422 are reflected by the dichroic reflection layer 388. Accordingly, such a dichroic reflection layer 388 is also referred to as a yellow reflection filter.

As a more detailed example, since the red light and the green light are reflected from the dichroic reflection layer 388, a light emitted toward the liquid crystal layer 333, among the red light and the green light generated in the first color conversion layer 412 and the second color conversion layer 422, is reflected toward the second substrate 302 by the dichroic reflection layer 388 to be output to the outside. Accordingly, the luminous efficiency of the display device may be improved.

The dichroic reflection layer 388 may include a plurality of high refractive index layers and a plurality of low refractive index layers that are alternately stacked. The dichroic reflection layer 388 may selectively transmit light by a multi-film interference phenomenon caused by the plurality of high refractive index layers and the plurality of low refractive layers. The low refractive index layer may include at least one of $MgF_2$ and $SiO_2$, and the high refractive index layer may include at least one of Ag, $TiO_2$, $Ti_2O_3$ and $Ta_2O_3$, but exemplary embodiments are not limited thereto. Each layer may have a thickness corresponding to a range of about ⅛ to about ½ of a wavelength of a transmitted light.

The wavelength of the transmitted light and the reflected light may be adjusted depending on the configuration of each layer included in the dichroic reflection layer 388.

As illustrated in FIGS. 6 and 10, the planarization layer 356 is located on the dichroic reflection layer 388. The planarization layer 356 may be located over an entire surface of the second substrate 302 including the dichroic reflection layer 388. One surface of the planarization layer 356 facing the first substrate 301 is flat.

The polarization layer 700 illustrated in FIGS. 6, 7, 8, 9 and 10 polarizes a light having emitted from the backlight unit 444 and passed through the polarization plate 381 and the liquid crystal layer 333.

As illustrated in FIGS. 6, 7, 8, 9 and 10, the polarization layer 700 is located on the planarization layer 356. For example, the polarization layer 700 is located on a planar surface of the planarization layer 356. A transmission axis of the polarization layer 700 and a transmission axis of the polarization plate 381 are orthogonal to each other. One of these transmission axes is arranged parallel to the data line. For example, the transmission axis of the polarization layer 700 is parallel to the first, second and third data lines DL1, DL2 and DL3.

As illustrated in FIGS. 5, 6, 7, 8, 9 and 10, the polarization layer 700 may include a plurality of polarization lines 750.

Each of the polarization lines 750 is substantially parallel to the data line DL. In addition, the polarization lines 750 are parallel to one another.

The polarization lines 750 are spaced apart from one another by a predetermined distance. An interval between any two adjacent polarization lines 750 may be equal to an interval between another two adjacent polarization lines 750. The interval between adjacent ones of the polarization lines 750 is less than the wavelength of visible light (about 400 nm to about 800 nm). For example, the interval between adjacent ones of the polarization lines 750 may be greater than zero and less than about 40 nm.

The polarization layer 700 may be transferred onto the planarization layer 356 by a stamping method or an imprinting method. The polarization layer 700 may be a wire grid polarizer. The polarization layer 700 may include a metal material such as aluminum (Al), gold (Au), silver (Ag), copper (Cu), chromium (Cr), iron (Fe) and nickel (Ni). The polarization layer 700 may include at least one of aluminum (Al), gold (Au), silver (Ag), copper (Cu), chromium (Cr), iron (Fe) and nickel (Ni).

The common electrode 330 is located on the polarization layer 700. The common electrode 330 is located over an entire surface of the second substrate 302 including the polarization layer 700. The common electrode 330 directly contacts the polarization layer 700. The common electrode 330 is not located between adjacent ones of the polarization lines 750. In other words, the polarization lines 750 are spaced apart from each other by a significantly small distance in the order of nanometers, such that the common electrode 330 is not located between adjacent ones of the polarization lines 750. Accordingly, a portion of the common electrode 330 faces the planarization layer 356. A hole 909 defined by being surrounded by the polarization lines 750, the planarization layer 356 and the common electrode 330 that are adjacent to one another may be filled with air.

The common electrode 330 receives a common voltage from a power supply (not illustrated). The common voltage of the common electrode 330 is applied to the polarization layer 700.

Figure 11:
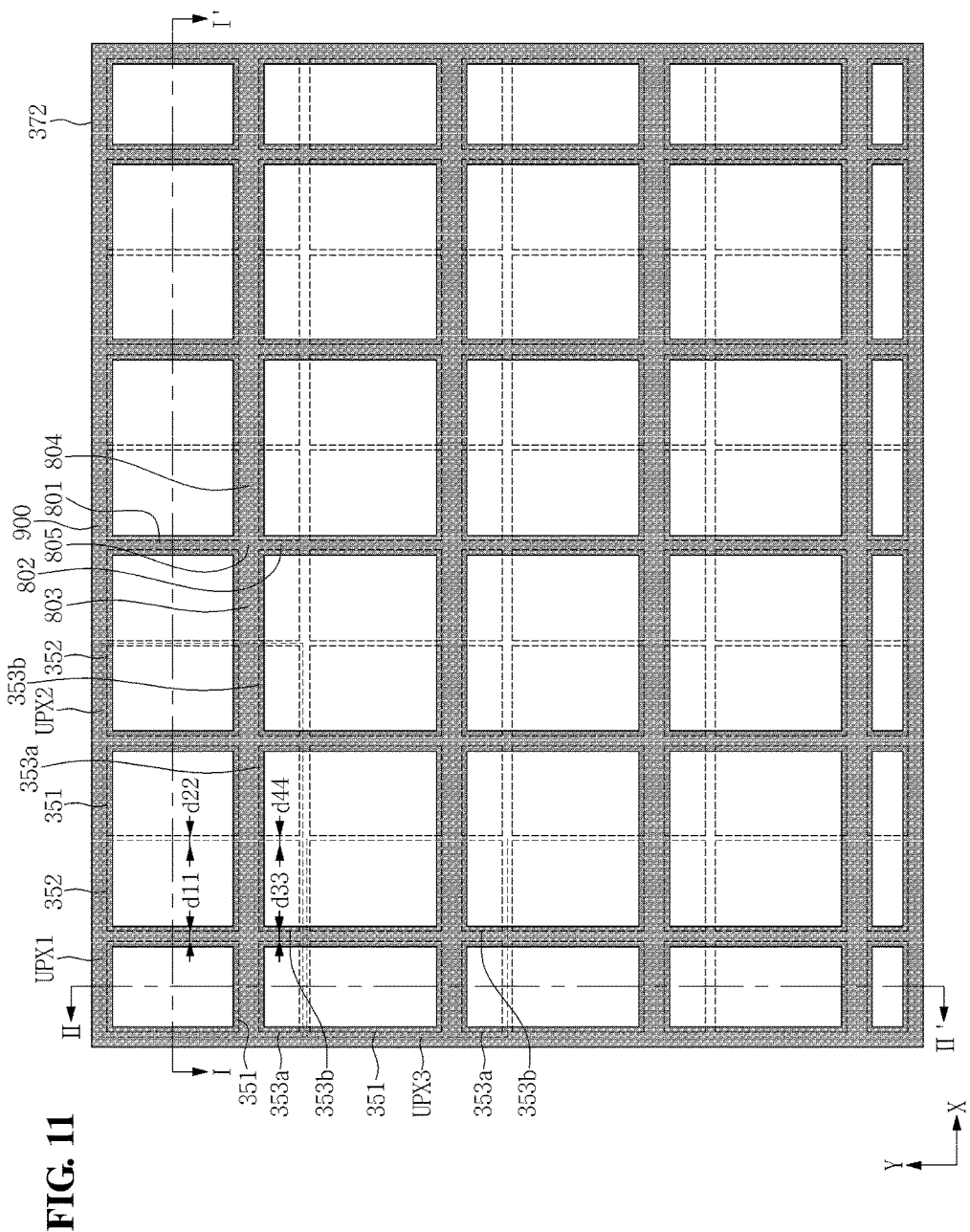
FIG. 11 is an overall view illustrating a second light blocking layer of FIG. 3.

FIG. 11 is an overall view illustrating the second light blocking layer 372 of FIG. 3.

As illustrated in FIG. 11, the second light blocking layer 372 may further include an outer frame portion 900.

The outer frame portion 900 may have a quadrangular ring shape enclosing entire unit pixels. The outer frame portion 900 may be unitary (e.g., integrally formed in a monolithic structure) with the first, second, third, fourth and fifth light blocking portions 801, 802, 803, 804 and 805 described above.

As illustrated in FIG. 11, the second light blocking layer 372 is not located between two adjacent unit pixels UPX. As a more detailed example, the second light blocking layer 372 is not located between adjacent unit pixels arranged along the X-axis direction, and the second light blocking layer 372 is also not located between adjacent unit pixels arranged along the Y-axis direction. As a more specific example, the second light blocking layer 372 is not located between the second color layer 352 of the first unit pixel UPX1 and the first color layer 351 of the second unit pixel UPX2 adjacent thereto. In addition, the second light blocking layer 372 is not located between the second divided color layer 353b of the first unit pixel UPX1 and the first divided color layer 353a of the second unit pixel UPX2 adjacent thereto. In addition, the second light blocking layer 372 is not located between the first divided color layer 353a of the first unit pixel UPX1 and the first color layer 351 of the third unit pixel UPX3. In addition, the second light blocking layer 372 is not located between the second divided color layer 353b of the first unit pixel UPX1 and the second color layer 352 of the third unit pixel UPX3.

The first unit pixel UPX1 and the second unit pixel UPX2 adjacent to each other in the X-axis direction may have a symmetric shape with respect to an imaginary line passing through between the first unit pixel UPX1 and the second unit pixel UPX2 in parallel to the Y-axis direction.

A distance d22 between the second color layer 352 included in the first unit pixel UPX1 and the first color layer 351 included in the second unit pixel UPX2 may be less than a distance d11 between the first color layer 351 included in the first unit pixel UPX1 and the second color layer 352 included in the first unit pixel UPX1.

A distance d44 between the second divided color layer 353b included in the first unit pixel UPX1 and the first divided color layer 353a included in the second unit pixel UPX2 may be less than a distance d33 between the first divided color layer 353a included in the first unit pixel UPX1 and the second divided color layer 353b included in the first unit pixel UPX1.

Figure 12:
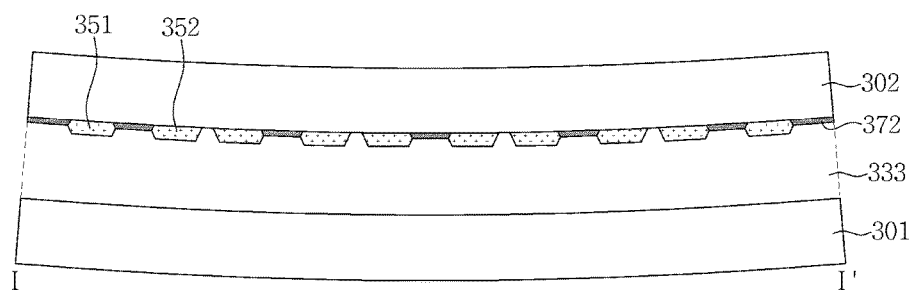
FIG. 12 is a cross-sectional view taken along the line I-I' of FIG. 11.
Figure 13:
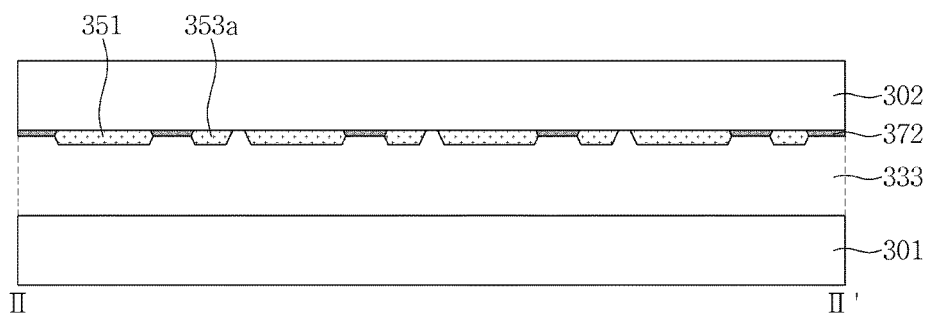
FIG. 13 is a cross-sectional view taken along the line II-II' of FIG. 11.

FIG. 12 is a cross-sectional view taken along the line I-I' of FIG. 11, and FIG. 13 is a cross-sectional view taken along the line II-II' of FIG. 11. The first substrate 301, the second substrate 302, the first color layer 351, the second color layer 352, the third color layer 353, the second light blocking layer 372 and the liquid crystal layer 333 are only illustrated in FIGS. 12 and 13, and the other components illustrated in FIGS. 1, 2, 3, 4, 5, 6, 7, 8, 9 and 10 have been omitted for convenience of explanation.

The display device according to an exemplary embodiment may be a curved display device. For example, the display device according to an exemplary embodiment may have a curved surface which is curved along the X-axis direction. In other words, the X-axis may be a curve having a parabolic shape, and the first substrate 301 and the second substrate 302 may have a parabolic cross-section as the X-axis. In such an exemplary embodiment, the components on the first substrate 301 and the components on the second substrate 302 may have a parabolic cross-section as the curved X-axis. Further, although not illustrated, the backlight unit 444 may also have a parabolic cross-section as described above.

Meanwhile, the display device according to an exemplary embodiment may have a flat surface along the Y-axis direction as illustrated in FIG. 13.

As described above, in the case where the display device according to an exemplary embodiment is a curved display device, a distance between unit pixels adjacent to each other in the X-axis direction is further reduced as compared with a distance between pixels of a flat display device. For example, an interval between the second color layer 352 of the first unit pixel UPX1 and the first color layer 351 of the second unit pixel UPX2 adjacent thereto is further reduced. As described above, since the second light blocking layer 372 is absent between the second color layer 352 of the first unit pixel UPX1 and the first color layer 351 of the second unit pixel UPX2, a light emitted from the second color layer 352 of the first unit pixel UPX1 and a light emitted from the first color layer 351 of the second unit pixel UPX2 interfere with each other. In other words, the light from the second color layer 352 included in the first unit pixel UPX1 and the light from the first color layer 351 included in the second unit pixel UPX2 may be mixed with each other. Accordingly, it is preferable that the second color layer 352 of the first unit pixel UPX1 and the first color layer 351 of the second unit pixel UPX2 emit lights of a substantially same color. In other words, it is preferable that color layers adjacent to each other in the X-axis direction and included in different unit pixels emit a substantially same color, which will be described in detail with reference to the drawings.

Figure 14:
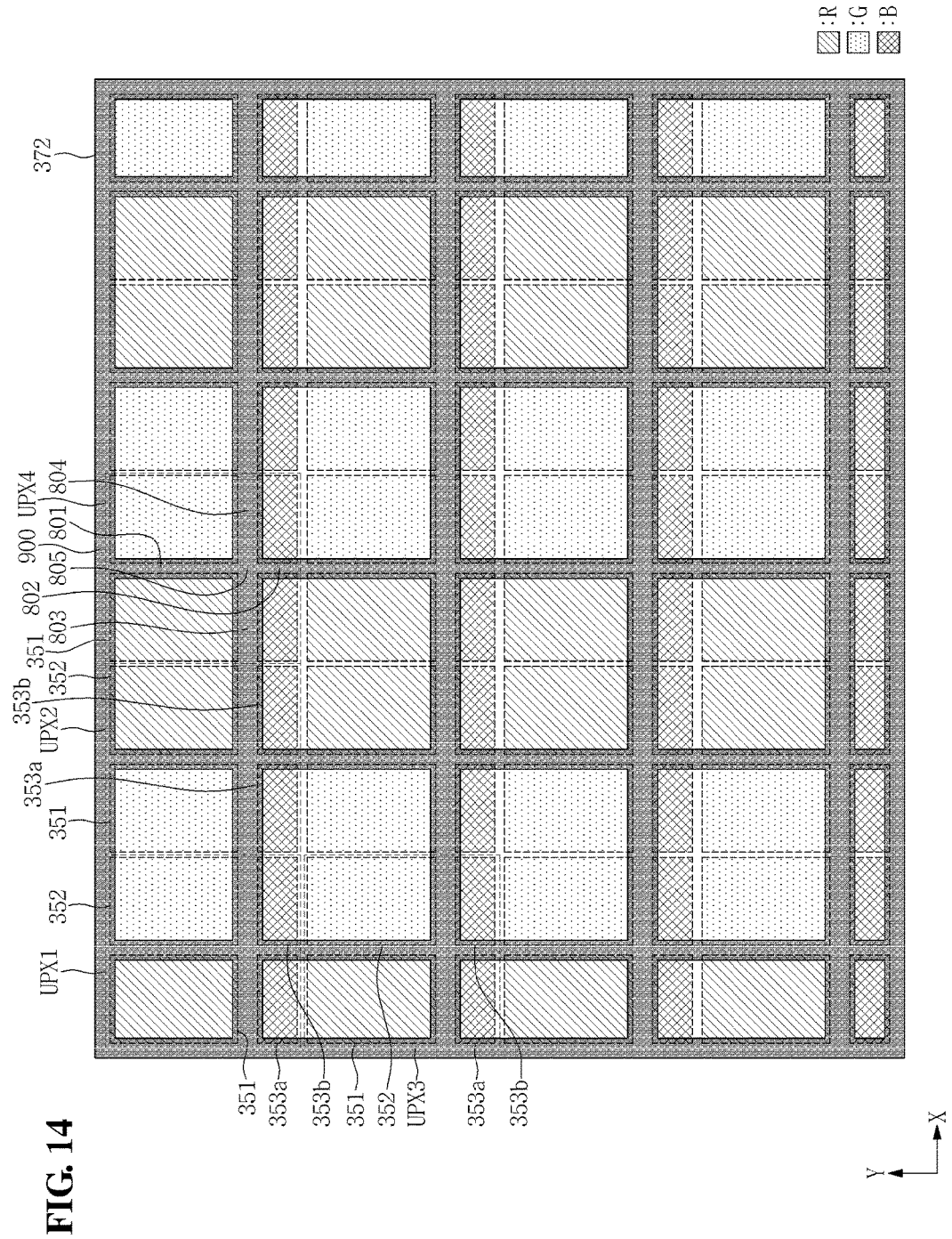
FIG. 14 is an explanatory view illustrating an arrangement of color layers according to an exemplary embodiment.

FIG. 14 is an explanatory view illustrating an arrangement of color layers according to an exemplary embodiment.

As illustrated in FIG. 14, color layers adjacent to each other in the X-axis direction and included in different unit pixels emit lights of a substantially same color. As an example, each of the second color layer 352 of the first unit pixel UPX1 and the first color layer 351 of the second unit pixel UPX2 which is adjacent to the first unit pixel UPX1 in the X-axis direction is a green color layer G that emits a green light.

As another example, in the case where a unit pixel adjacent to the second unit pixel UPX2 in the X-axis direction and located to the right of the second unit pixel UPX2 is defined as a fourth unit pixel UPX4, each of the second color layer 352 of the second unit pixel UPX2 and the first color layer 351 of the fourth unit pixel UPX4 is a red color layer R that emits a red light.

In an exemplary embodiment, the third color layers 353 of respective unit pixels adjacent to each other in the X-axis direction are all blue color layers B that emit a blue light. For example, each of the second divided color layer 353b of the first unit pixel UPX1 and the first divided color layer 353a of the second unit pixel UPX2 is a blue color layer B that emits a blue light.

In an exemplary embodiment, as illustrated in FIG. 14, the first color layers 351 adjacent to each other in the Y-axis direction and included in different unit pixels emit lights of a substantially same color. For example, each of the first color layer 351 of the first unit pixel UPX1 and the first color layer 351 of the third unit pixel UPX3 which is adjacent to the first unit pixel UPX1 in the Y-axis direction is a red color layer R. In addition, as illustrated in FIG. 14, the second color layers 351 adjacent to each other in the Y-axis direction and included in different unit pixels emit lights of a substantially same color. For example, each of the second color layer 352 of the first unit pixel UPX1 and the second color layer 352 of the third unit pixel UPX3 which is adjacent to the first unit pixel UPX1 in the Y-axis direction is a green color layer G.

Figure 15:
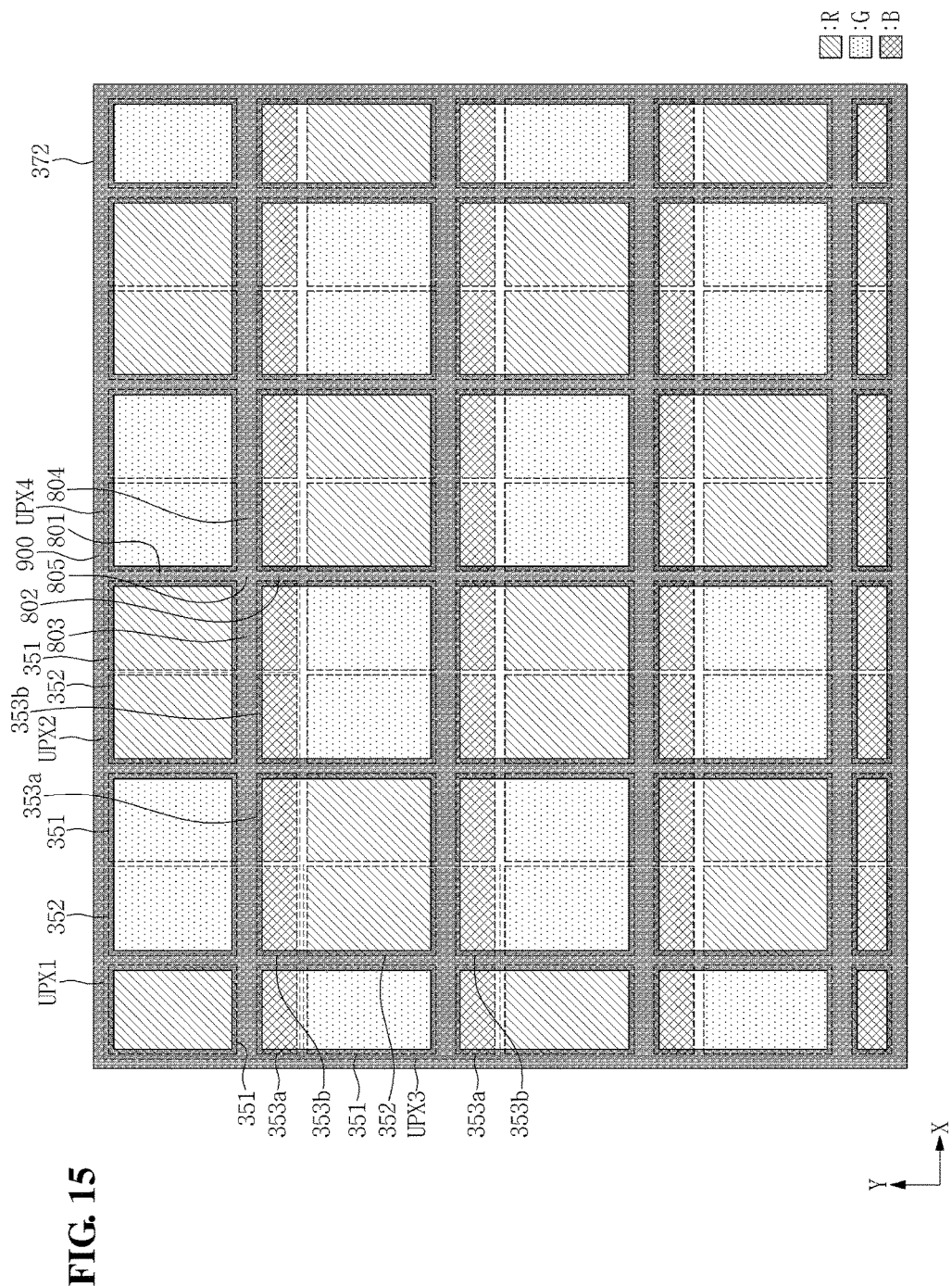
FIG. 15 is an explanatory view illustrating an arrangement of color layers according to an alternative exemplary embodiment.

FIG. 15 is an explanatory view illustrating an arrangement of color layers according to an alternative exemplary embodiment.

As illustrated in FIG. 15, color layers adjacent to each other in the X-axis direction and included in different unit pixels emit lights of a substantially same color. A specific example of this will make reference to FIG. 14 and the related description.

In an exemplary embodiment, third color layers 353 of respective unit pixels adjacent to each other in the X-axis direction are all blue color layers that emit a blue light. A specific example of this will make reference to FIG. 14 and the related description.

In an exemplary embodiment, as illustrated in FIG. 15, first color layers 351 adjacent to each other in the Y-axis direction and included in different unit pixels emit lights of different colors, respectively. For example, a first color layer 351 of a first unit pixel UPX1 is a red color layer R that emits a red light, and a first color layer 351 of a third unit pixel UPX3 which is adjacent to the first unit pixel UPX1 in the Y-axis direction is a green color layer G that emits a green light. In addition, as illustrated in FIG. 15, second color layers 352 adjacent to each other in the Y-axis direction and included in different unit pixels emit lights of a substantially same color. For example, a second color layer 352 of the first unit pixel UPX1 is a green color layer G that emits a green light, and a second color layer 352 of a third unit pixel UPX3 is a red color layer that emits a red light.

Figure 16:
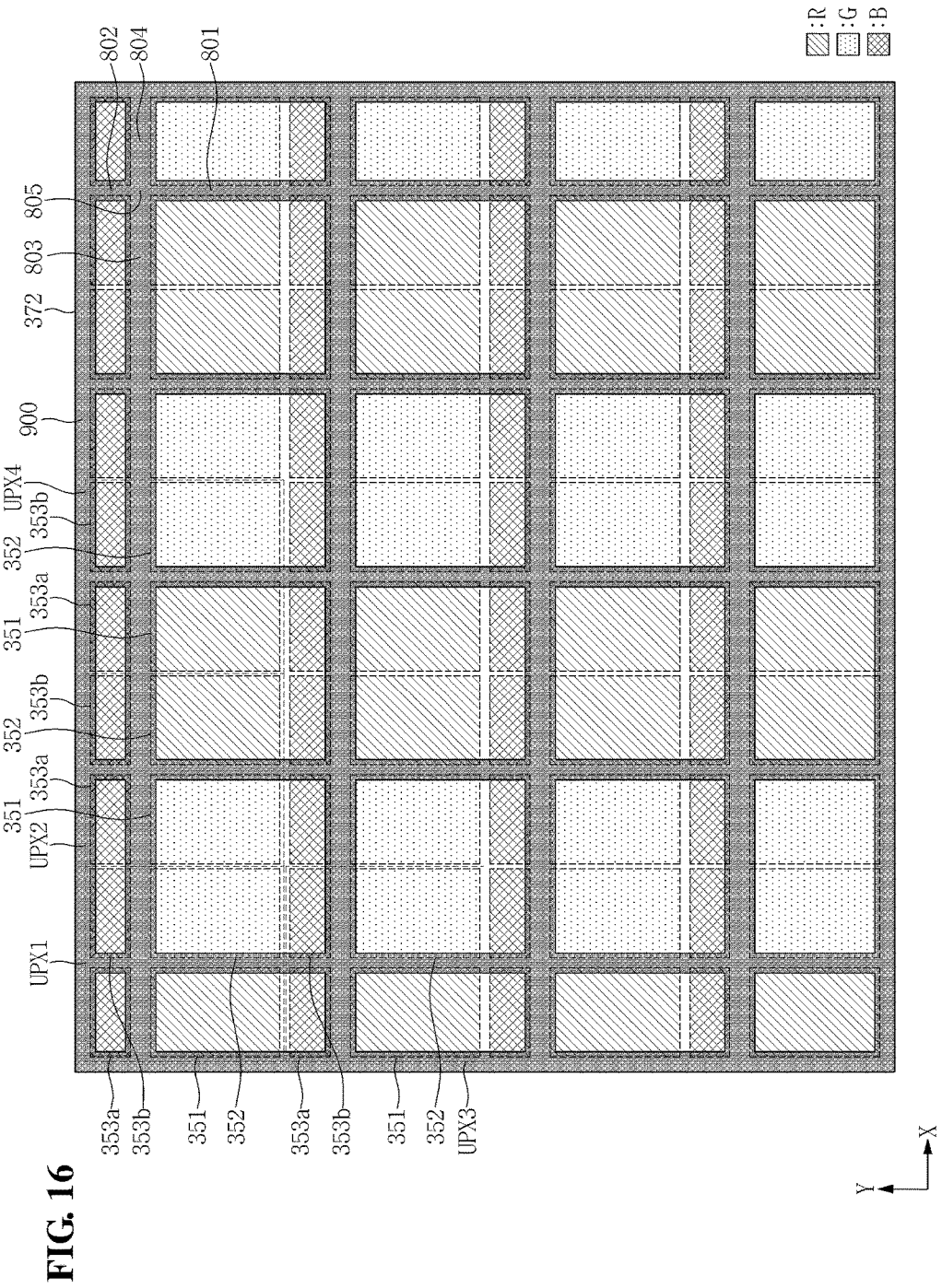
FIG. 16 is an explanatory view illustrating an arrangement of color layers according to another alternative exemplary embodiment.

FIG. 16 is an explanatory view illustrating an arrangement of color layers according to another alternative exemplary embodiment.

As illustrated in FIG. 16, color layers included in one unit pixel are located at quadrants different from quadrants at which the aforementioned color layers of FIG. 2 are located. For example, a first unit pixel UPX1 of FIG. 16 includes a first color layer 351, a second color layer 352, a first divided color layer 353a and a second divided color layer 353b. In such an exemplary embodiment, a first divided color layer 353a of the first unit pixel UPX1 is located at a first quadrant, a second divided color layer 353b of the first unit pixel UPX1 is located at a second quadrant, a first color layer 351 of the first unit pixel UPX1 is located at a third quadrant and a second color layer 352 of the first unit pixel UPX1 is located at a fourth quadrant.

As illustrated in FIG. 16, color layers adjacent to each other in the X-axis direction and included in different unit pixels emit lights of a substantially same color. A specific example of this will make reference to FIG. 14 described above and the related description.

In an exemplary embodiment, the first divided color layers 353a and the second divided color layers 353b of respective unit pixels adjacent to each other in the X-axis direction are all blue color layers B that emit a blue light. A specific example of this will make reference to FIG. 14 described above and the related description.

In an exemplary embodiment, as illustrated in FIG. 16, the first color layers 351 adjacent to each other in the Y-axis direction and included in different unit pixels emit lights of a substantially same color. A specific example of this will make reference to FIG. 14 and the related description.

Figure 17:
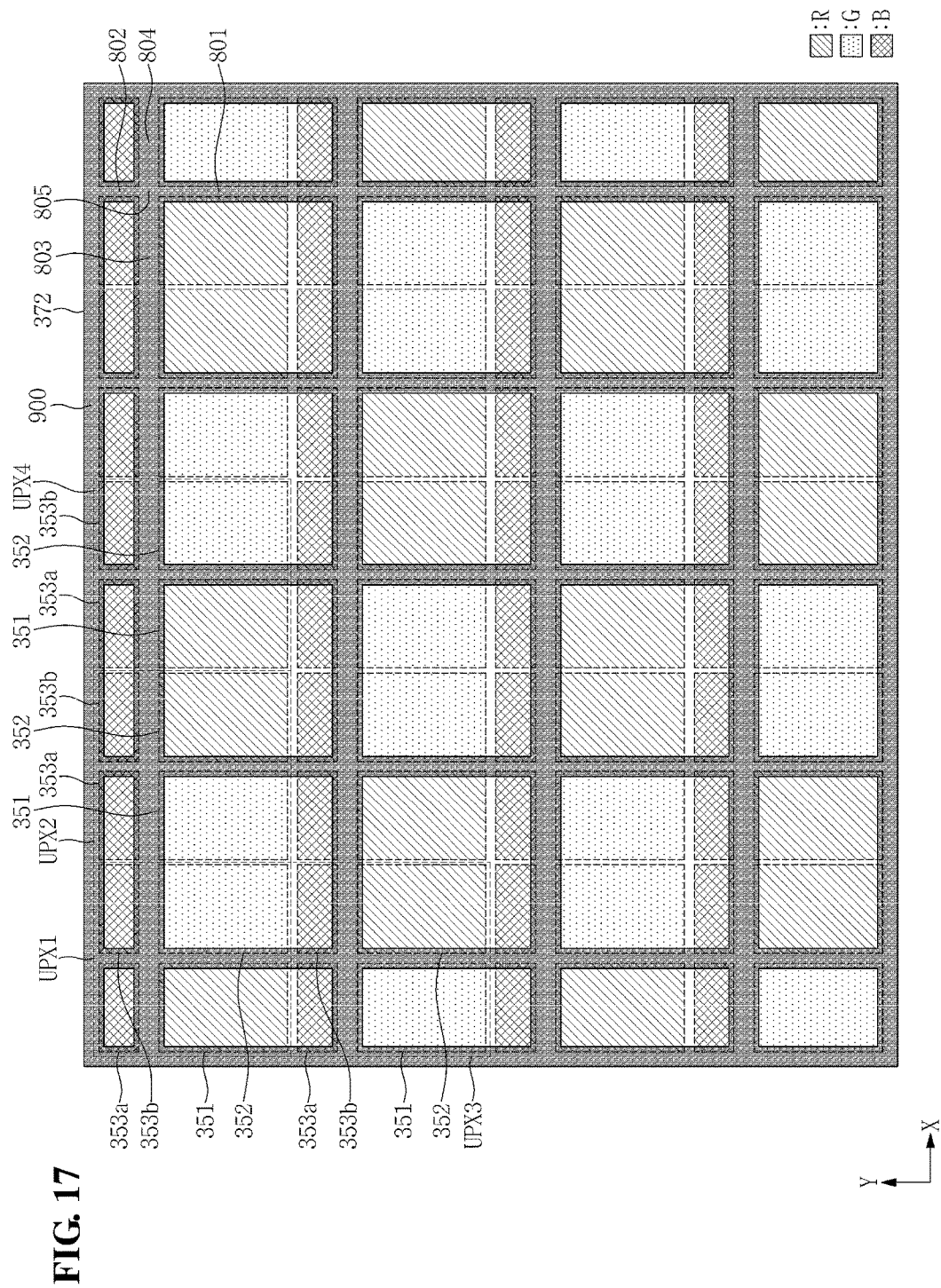
FIG. 17 is an explanatory view illustrating an arrangement of color layers according to still another alternative exemplary embodiment.

FIG. 17 is an explanatory view illustrating an arrangement of color layers according to still another alternative exemplary embodiment;

As illustrated in FIG. 17, color layers included in one unit pixel are located at quadrants different from quadrants at which the aforementioned color layers of FIG. 2 are located. A specific example of this will make reference to FIG. 16 and the related description.

As illustrated in FIG. 17, color layers adjacent to each other in the X-axis direction and included in different unit pixels emit lights of a substantially same color. A specific example of this will make reference to FIG. 14 and the related description.

In an exemplary embodiment, first divided color layers 353a and second divided color layers 353b of respective unit pixels adjacent to each other in the X-axis direction are all blue color layers B that emit a blue light. A specific example of this will be described with reference to FIG. 14 described above and the related description.

In an exemplary embodiment, as illustrated in FIG. 17, the first color layers 351 adjacent to each other in the Y-axis direction and included in different unit pixels emit lights of different colors, respectively. A specific example of this will make reference to FIG. 15 and the related description.

Figure 18:
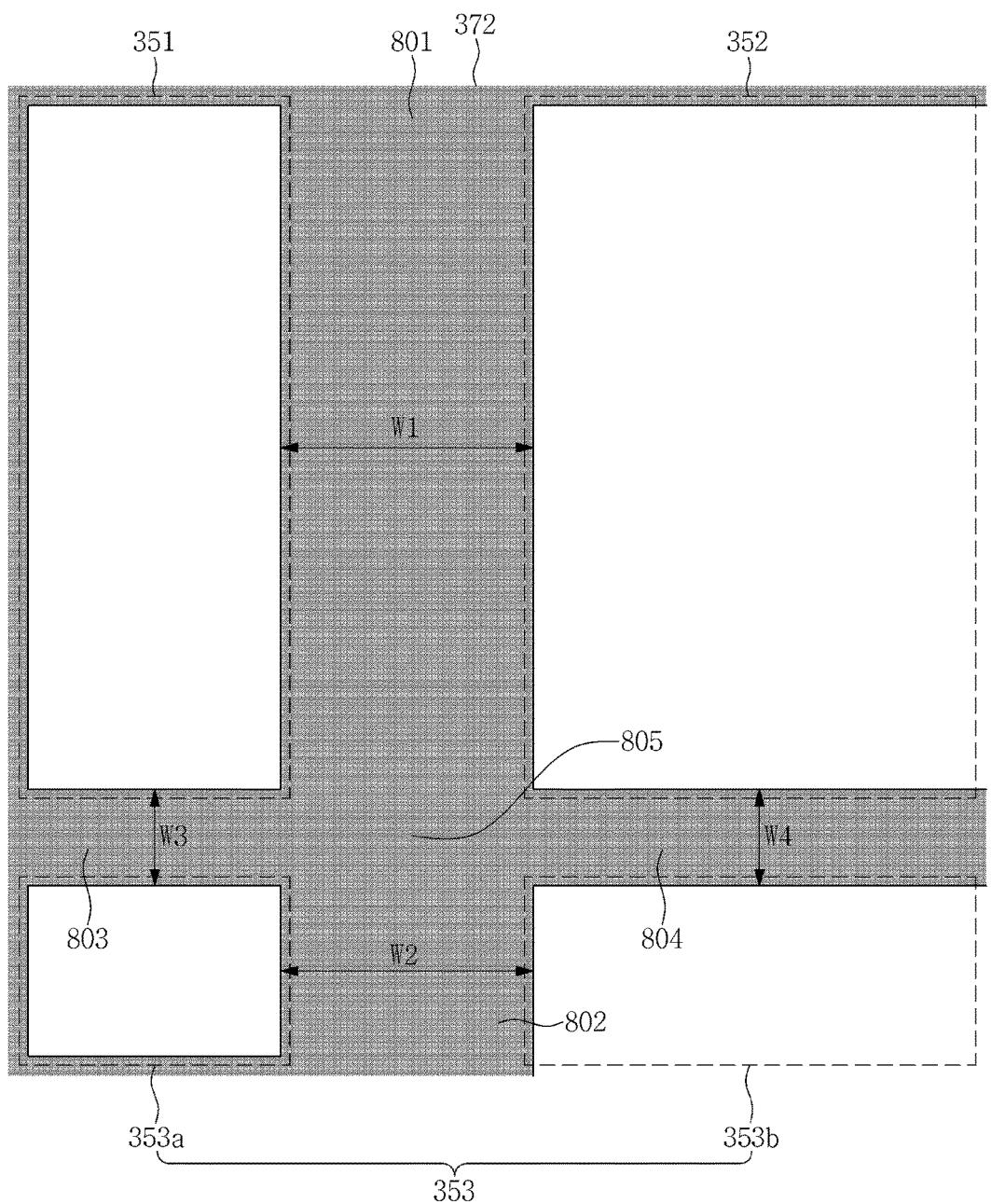
FIG. 18 is an explanatory view illustrating the size of color layers included in one unit pixel.

FIG. 18 is an explanatory view illustrating the size of color layers included in one unit pixel.

As described above, at least two of the first color layer 351, the second color layer 352 and the third color layer 353 included in one unit pixel UPX may have different sizes.

For example, in the case where the first color layer 351 of one unit pixel UPX is a red color layer that emits a red light, the second color layer 352 of said unit pixel UPX is a green color layer that emits a green light and the third color layer 353 of said unit pixel UPX is a blue color layer that emits a blue light, the first color layer 351 may have a size less than a size of the second color layer 352, and the third color layer 353 may have a size less than a size of the first color layer 351, as illustrated in FIG. 18. In such an exemplary embodiment, the first divided color layer 353a adjacent to the first color layer 351 may have a size less than a size of the second divided color layer 353b adjacent to the second color layer 352.

Figure 19:
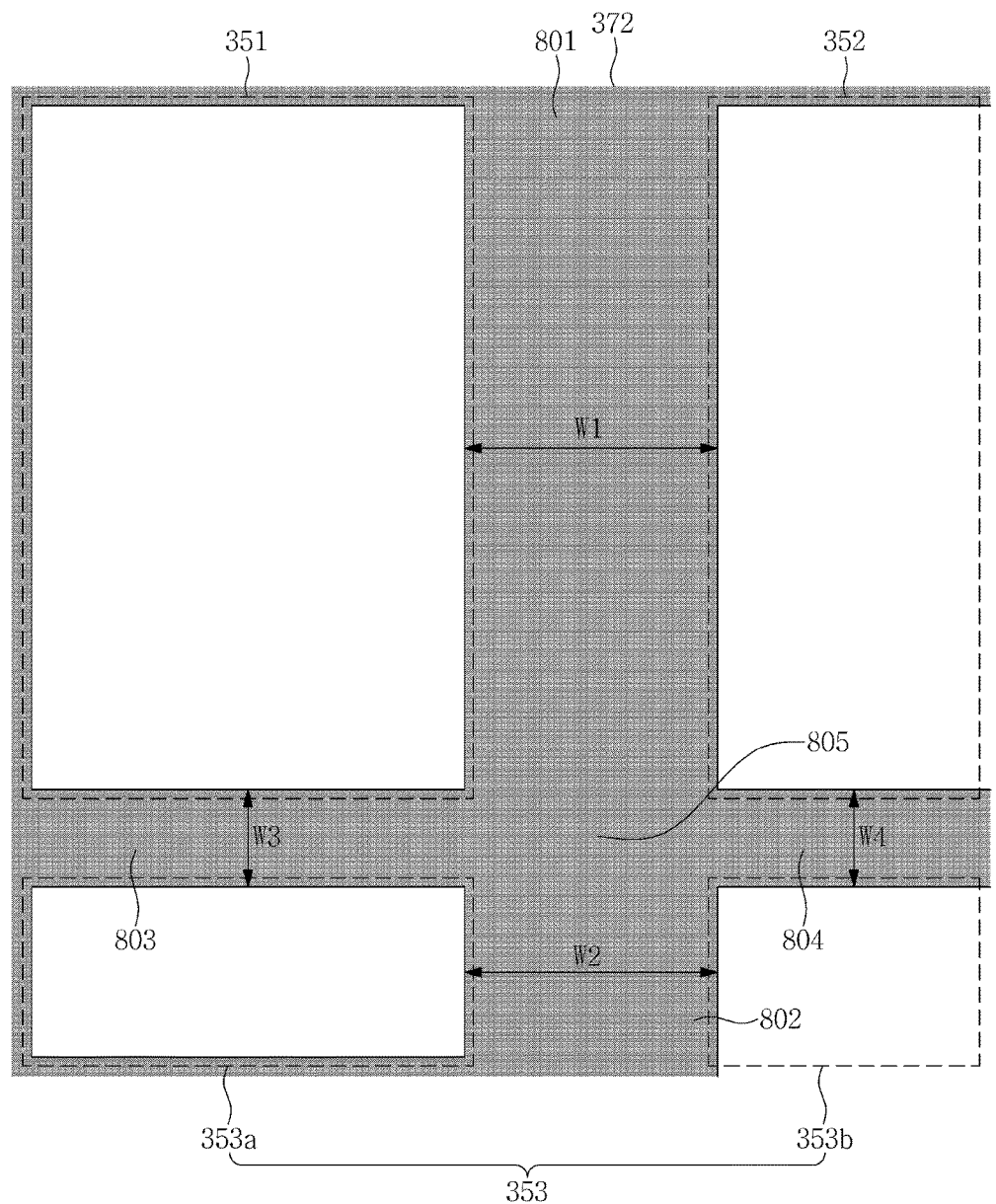
FIG. 19 is another explanatory view illustrating the size of color layers included in one unit pixel.

FIG. 19 is another explanatory view illustrating the size of color layers included in one unit pixel.

As described above, at least two of the first color layer 351, the second color layer 352 and the third color layer 353 included in one unit pixel UPX may have different sizes.

For example, in the case where the first color layer 351 of one unit pixel UPX is a red color layer that emits a red light, the second color layer 352 of said unit pixel UPX is a green color layer that emits a green light and the third color layer 353 of said unit pixel UPX is a blue color layer that emits a blue light, the second color layer 352 may have a size less than a size of the first color layer 351, and the third color layer 353 may have a size less than a size of the second color layer 352, as illustrated in FIG. 19. In such an exemplary embodiment, the second divided color layer 353b adjacent to the second color layer 352 may have a size less than a size of the first divided color layer 353a adjacent to the first color layer 351.

Figure 20:
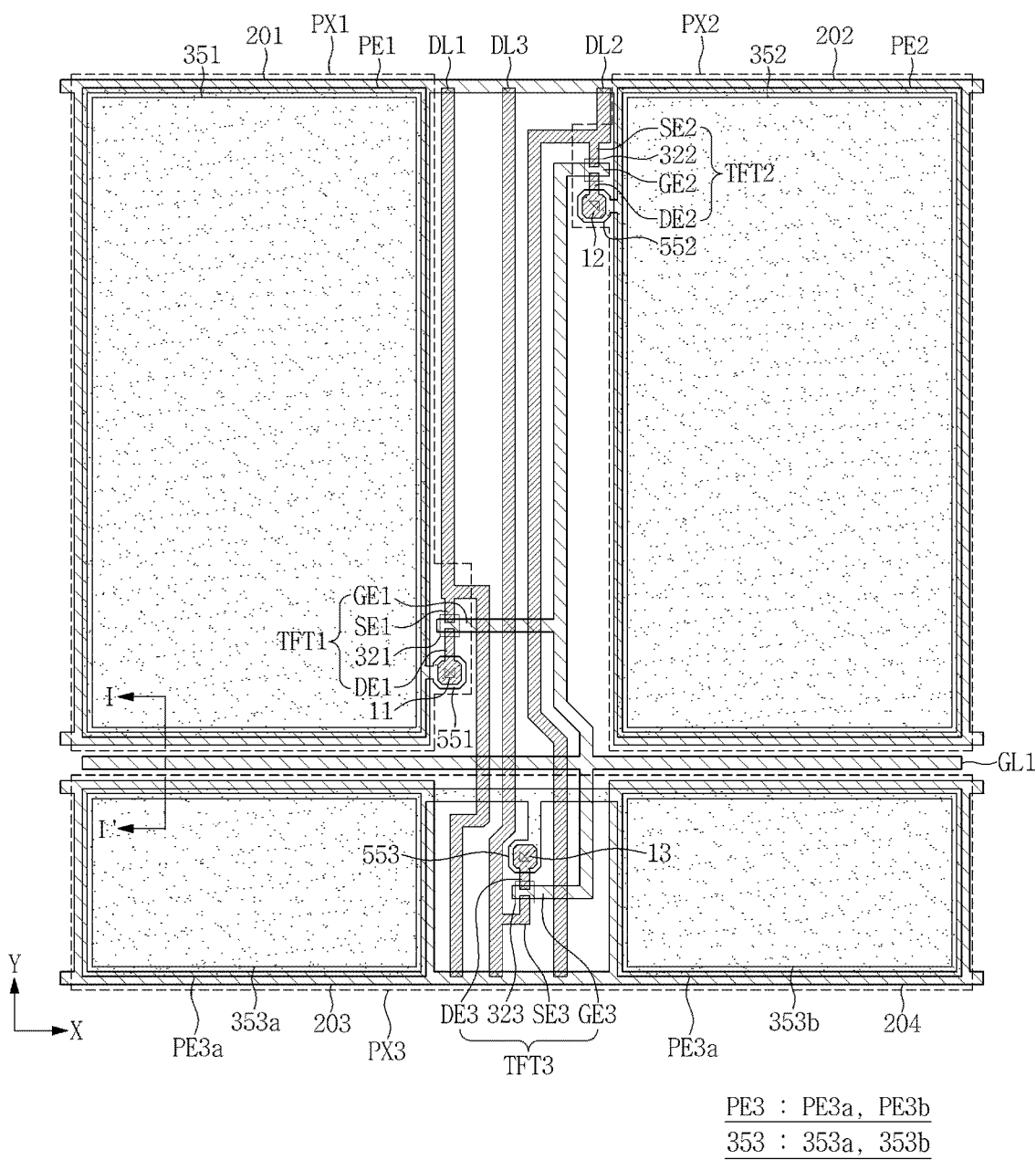
FIG. 20 is a detailed configuration view illustrating the unit pixel of FIG. 1 according to an alternative exemplary embodiment.
Figure 21:
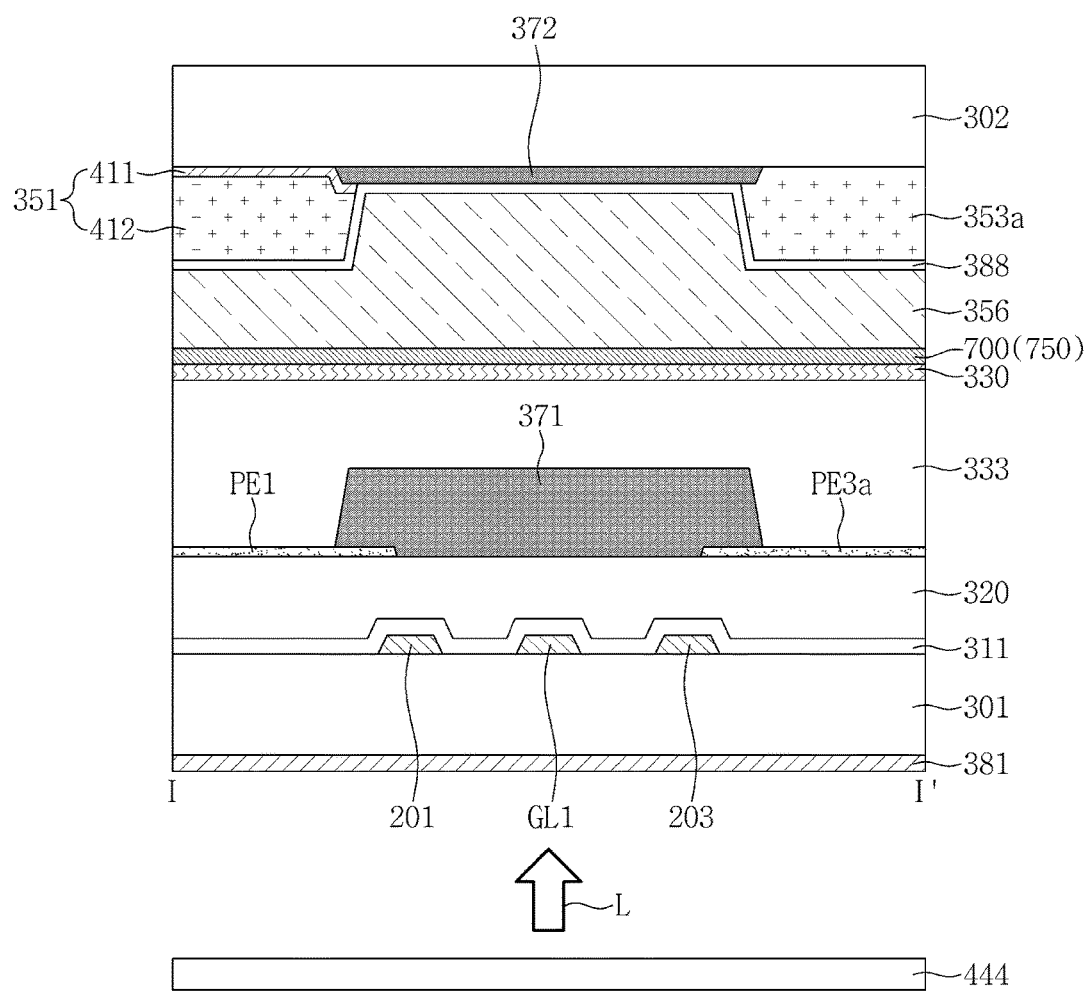
FIG. 21 is a cross-sectional view taken along the line I-I' of FIG. 1.

FIG. 20 is a detailed configuration view illustrating the unit pixel of FIG. 1 according to an alternative exemplary embodiment, and FIG. 21 is a cross-sectional view taken along the line I-I' of FIG. 1.

As illustrated in FIGS. 20 and 21, the display device according to an exemplary embodiment may further include a first sustain electrode 201, a second sustain electrode 202, a third sustain electrode 203 and a fourth sustain electrode 204.

From a plan view, as illustrated in FIG. 20, the first sustain electrode 201 may have a quadrangular ring shape enclosing a first pixel electrode PE1 and a first color layer 351. The first sustain electrode 201 may overlap the first pixel electrode PE1. For example, the first sustain electrode 201 may overlap an edge portion of the first pixel electrode PE1.

From a vertical viewpoint, as illustrated in FIG. 21, the first sustain electrode 201 is located on a first substrate 301. The first sustain electrode 201 may be located on a substantially same layer as a layer on which a first gate line GL1 is disposed. The first sustain electrode 201 may include a substantially same material and may have a substantially same structure (a multilayer structure) as those of the aforementioned first gate line GL1. The first sustain electrode 201 and the first gate line GL1 may be formed substantially simultaneously in a substantially same process.

From a plan view, as illustrated in FIG. 20, the second sustain electrode 202 may have a quadrangular ring shape enclosing a second pixel electrode PE2 and a second color layer 352. The second sustain electrode 202 may overlap the second pixel electrode PE2. For example, the second sustain electrode 202 may overlap an edge portion of the second pixel electrode PE2.

From a vertical viewpoint, the second sustain electrode 202 is located on the first substrate 301. The second sustain electrode 202 may be located on a substantially same layer as a layer on which the first gate line GL1 is disposed. The second sustain electrode 202 may include a substantially same material and may have a substantially same structure (a multilayer structure) as those of the aforementioned first gate line GL1. The second sustain electrode 202 and the first gate line GL1 may be formed substantially simultaneously in a substantially same process.

The second sustain electrode 202 may be connected to the first sustain electrode 201. To this end, for example, the second sustain electrode 202 and the first sustain electrode 201 may be unitary (e.g., integrally formed in a monolithic structure).

From a plan view, as illustrated in FIG. 20, the third sustain electrode 203 may have a quadrangular ring shape enclosing a first divided pixel electrode PE3a and a first divided color layer 353a. The third sustain electrode 203 may overlap the first divided pixel electrode PE3a. For example, the third sustain electrode 203 may overlap an edge portion of the first divided pixel electrode PE3a.

From a vertical viewpoint, the third sustain electrode 203 is located on the first substrate 301. The third sustain electrode 203 may be located on a substantially same layer as a layer on which the first gate line GL1 is disposed. The third sustain electrode 203 may include a substantially same material and may have a substantially same structure (a multilayer structure) as those of the aforementioned first gate line GL1. The third sustain electrode 203 and the first gate line GL1 may be formed substantially simultaneously in a substantially same process.

From a plan view, as illustrated in FIG. 20, the fourth sustain electrode 204 may have a quadrangular ring shape enclosing a second divided pixel electrode PE3b and a second divided color layer 353b. The fourth sustain electrode 204 may overlap the second divided pixel electrode PE3b. For example, the fourth sustain electrode 204 may overlap an edge portion of the second divided pixel electrode PE3b.

From a vertical viewpoint, the fourth sustain electrode 204 is located on the first substrate 301. The fourth sustain electrode 204 may be located on a substantially same layer as a layer on which the first gate line GL1 is disposed. The fourth sustain electrode 204 may include a substantially same material and may have a substantially same structure (a multilayer structure) as those of the aforementioned first gate line GL1. The fourth sustain electrode 204 and the first gate line GL1 may be formed substantially simultaneously in a substantially same process.

The fourth sustain electrode 204 may be connected to the third sustain electrode 203. To this end, for example, the fourth sustain electrode 204 and the third sustain electrode 203 may be unitary (e.g., integrally formed in a monolithic structure).

The first, second, third and fourth sustain electrodes 201, 202, 203 and 204 receive a sustain voltage from a power supply. The sustain voltage is a DC voltage, which may be substantially equal to or different from a common voltage.

In an exemplary embodiment, sustain electrodes of adjacent unit pixels may be connected to each other. For example, the second sustain electrode 202 enclosing the second color layer 352 of the first unit pixel UPX1 of FIG. 11 may be connected to the first sustain electrode 201 enclosing the first color layer 351 of the second unit pixel UPX2. In addition, the third sustain electrode 203 enclosing the first divided color layer 353a of the first unit pixel UPX1 of FIG. 11 may be connected to the first sustain electrode 201 enclosing the first color layer 351 of the third unit pixel UPX3. In addition, the fourth sustain electrode 204 enclosing the second divided color layer 353b of the first unit pixel UPX1 is connected to the second sustain electrode 204 enclosing the second color layer 352 of the third unit pixel UPX3. In addition, the second sustain electrode 202 enclosing the second color layer 352 of the second unit pixel UPX2 is connected to the first sustain electrode 201 enclosing the first color layer 351 of the fourth unit pixel UPX4.

Figure 22:
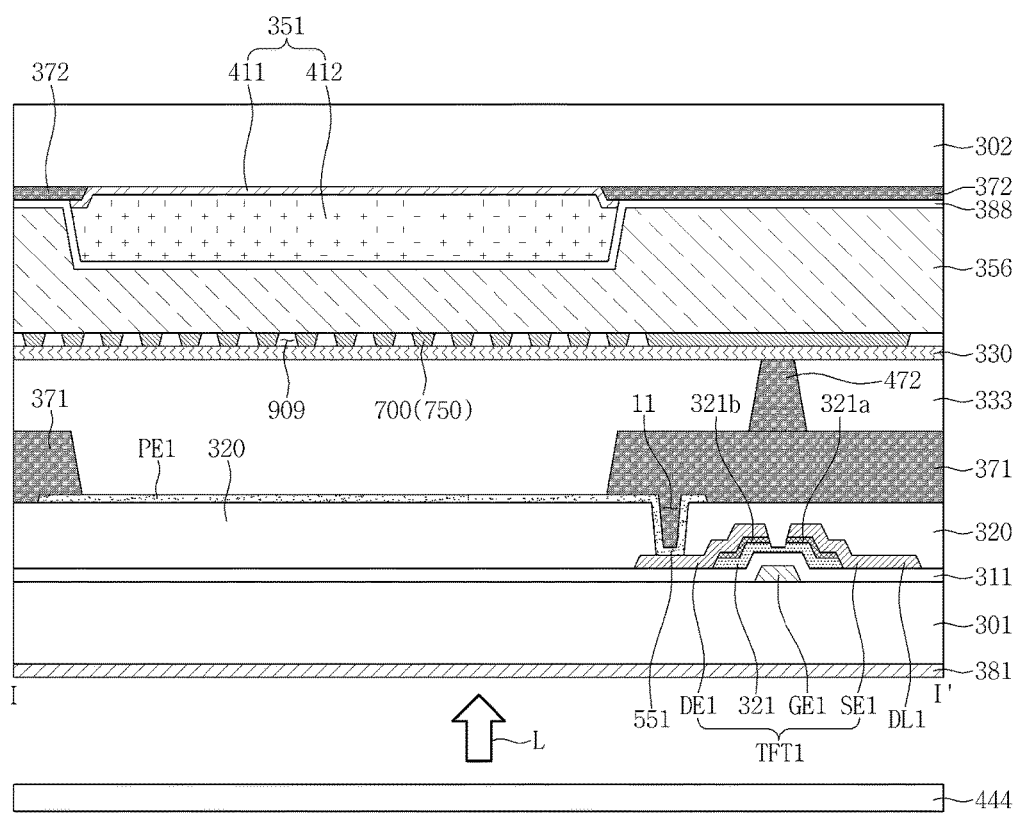
FIG. 22 is a cross-sectional view taken along the line I-I' of FIG. 3 according to an alternative exemplary embodiment.

FIG. 22 is a cross-sectional view taken along the line I-I' of FIG. 3 according to an alternative exemplary embodiment.

As illustrated in FIG. 22, a first light blocking layer 371 and a column spacer 472 may be manufactured through separate processes. That is, after the first light blocking layer 371 is formed first, the column spacer 472 may be formed on the light blocking layer through a separate process.

As set forth hereinabove, the display device according to one or more exemplary embodiments may provide the following effects.

One unit pixel includes a first color layer, a second color layer, a first divided color layer and a second divided color layer, and these color layers are respectively located at four quadrants divided with respect to a gate line and a data line, which cross each other, as a boundary. In such an exemplary embodiment, a width of a first light blocking portion between the first color layer and the second color layer adjacent to each other in a first direction is substantially equal to a width of a second light blocking portion between the first divided color layer and the second divided color layer adjacent to each other in a second direction. Accordingly, the problem of defective vertical lines, having a protrusion shape protruding in the first direction, which may appear at an area corresponding to the first light blocking portion and the second light blocking portion, may be addressed.

In addition, the display device includes color layers disposed adjacent to each other along a curved surface direction, and these color layers emit lights of a substantially same color. Accordingly, mixing of lights having different colors between adjacent color layers may be substantially prevented.

In addition, one unit pixel includes a first pixel electrode, a second pixel electrode, a first divided pixel electrode and a second divided pixel electrode, and the pixel electrodes are respectively located at four quadrants divided with respect to a gate line and a data line, which cross each other, as a boundary. Based on the arrangement structure of the pixel electrodes, a light blocking layer may be located between the four pixel electrodes included in one unit pixel. Accordingly, a width of the first light blocking portion between the first pixel electrode and the second pixel electrode and a width of the second light blocking portion between the first divided pixel electrode and the second divided pixel electrode may be adjusted to be substantially equal to each other.

While the present inventive concept has been illustrated and described with reference to the exemplary embodiments thereof, it will be apparent to those of ordinary skill in the art that various changes in form and detail may be made thereto without departing from the spirit and scope according to an exemplary embodiment.

What is claimed is:

1. A display device comprising:
a first substrate and a second substrate spaced apart from each other;
a first color layer and a second color layer adjacent to each other between the first substrate and the second substrate, the first color layer and the second color layer arranged along a direction parallel to a first direction;
a third color layer comprising a first divided color layer adjacent to the first color layer in a direction parallel to a second direction crossing the first direction and a second divided color layer adjacent to the first divided color layer in a direction parallel to the first direction and adjacent to the second color layer in a direction parallel to the second direction; and
a light blocking layer comprising a first light blocking portion between the first color layer and the second color layer and a second light blocking portion between the first divided color layer and the second divided color layer,
wherein the first color layer, the second color layer and the third color layer are configured to emit lights of different colors, respectively,
at least two of the first color layer, the second color layer and the third color layer have different sizes, and
a width of the first light blocking portion in a direction parallel to the first direction is substantially equal to a width of the second light blocking portion in a direction parallel to the first direction.

2. The display device as claimed in claim 1, wherein the first color layer, the second color layer and the third color layer are comprised in one unit pixel.

3. The display device as claimed in claim 1, wherein each of the first substrate and the second substrate has a curved surface curved along a direction parallel to the first direction.

4. The display device as claimed in claim 1, further comprising a fourth color layer adjacent to the second color layer in a direction parallel to the first direction, the fourth color layer configured to emit a light having a color substantially the same as a color of a light configured to be emitted by the second color layer; and
a fifth color layer adjacent to the fourth color layer in a direction parallel to the second direction and adjacent to the third color layer in a direction parallel to the first direction, the fifth color layer configured to emit a light having a color substantially the same as a color of a light configured to be emitted by the third color layer.

5. The display device as claimed in claim 4, wherein the first color layer, the second color layer and the third color layer are comprised in a first unit pixel, and
the fourth color layer and the fifth color layer are comprised in a second unit pixel.

6. The display device as claimed in claim 5, wherein the first unit pixel and the second unit pixel have a symmetric shape with respect to an imaginary line parallel to the second direction.

7. The display device as claimed in claim 4, wherein a distance between the second color layer and the fourth color layer is less than a distance between the first color layer and the second color layer.

8. The display device as claimed in claim 4, wherein the light blocking layer is absent between the second color layer and the fourth color layer.

9. The display device as claimed in claim 4, wherein the fifth color layer comprises a first divided color layer and a second divided color layer adjacent to each other in a direction parallel to the first direction,
the first divided color layer of the fifth color layer is adjacent to the second divided color layer of the third color layer in a direction parallel to the first direction, and
a distance between the second divided color layer of the third color layer and the first divided color layer of the fifth color layer is less than a distance between the first divided color layer of the third color layer and the second divided color layer of the third color layer.

10. The display device as claimed in claim 9, wherein the light blocking layer is absent between the second divided color layer of the third color layer and the first divided color layer of the fifth color layer.

11. The display device as claimed in claim 1, further comprising:
a first pixel electrode located on the first substrate corresponding to the first color layer;
a second pixel electrode located on the first substrate corresponding to the second color layer; and
a third pixel electrode comprising a first divided pixel electrode located corresponding to the first divided color layer and a second divided pixel electrode located corresponding to the second divided color layer.

12. The display device as claimed in claim 11, wherein at least two of the first pixel electrode, the second pixel electrode and the third pixel electrode have different sizes.

13. The display device as claimed in claim 11, further comprising:
a first switching element connected to the first pixel electrode;
a second switching element connected to the second pixel electrode; and
a third switching element connected to the first divided pixel electrode and the second divided pixel electrode.

14. The display device as claimed in claim 13, further comprising:
a first data line connected to the first switching element;
a second data line connected to the second switching element;
a third data line connected to the third switching element; and
a gate line connected to the first switching element, the second switching element and the third switching element and crossing the first data line, the second data line and the third data line.

15. The display device as claimed in claim 14, wherein at least a portion of the first data line, at least a portion of the second data line and at least a portion of the third data line are located between the first color layer and the second color layer.

16. The display device as claimed in claim 14, wherein at least a portion of the first data line, at least a portion of the second data line and at least a portion of the third data line are located between the first divided color layer and the second divided color layer.

17. The display device as claimed in claim 14, wherein at least a portion of the gate line is located between the first color layer and the first divided color layer.

18. The display device as claimed in claim 14, wherein at least a portion of the gate line is located between the second color layer and the second divided color layer.

19. The display device as claimed in claim 14, wherein the first color layer is located at a first quadrant of quadrants which are defined by the gate line and one of the first data line, the second data line and the third data line, the second color layer is located at a second quadrant of the quadrants, the first divided color layer is located at a third quadrant of the quadrants, and the second divided color layer is located at a fourth quadrant of the quadrants.

20. The display device as claimed in claim 1, wherein at least one of the first color layer, the second color layer, the first divided color layer and the second divided color layer comprises a color conversion layer between the first substrate and the second substrate.

21. The display device as claimed in claim 20, wherein at least one of the first color layer, the second color layer, the first divided color layer and the second divided color layer further comprises a color filter layer between the color conversion layer and the second substrate.

22. The display device as claimed in claim 1, further comprising a polarization layer between the first substrate and the second substrate to overlap the first color layer, the second color layer, the third color layer and the light blocking layer.

23. The display device as claimed in claim 1, wherein facing edge portions of the first color layer and the second color layer overlap opposite edge portions of the first light blocking portion, and
facing edge portions of the first divided color layer and the second divided color layer overlap opposite edge portions of the second light blocking portion.

24. The display device as claimed in claim 1, wherein the first light blocking portion and the second light blocking portion are unitary.

25. The display device as claimed in claim 24, wherein the first light blocking portion and the second light blocking portion which are unitary have a straight line shape.

26. The display device as claimed in claim 1, further comprising a backlight unit facing the second substrate with the first substrate interposed between the backlight unit and the second substrate.

27. The display device as claimed in claim 26, wherein the backlight unit provides a white light or a blue light.

28. The display device as claimed in claim 26, further comprising a polarization plate between the backlight unit and the first substrate.

29. A display device comprising:
a first substrate and a second substrate spaced apart from each other;
a gate line on the first substrate;
a first data line, a second data line and a third data line crossing the gate line
a first switching element connected to the gate line and the first data line;
a second switching element connected to the gate line and the second data line;
a third switching element connected to the gate line and the third data line;
a first pixel electrode connected to the first switching element;
a second pixel electrode connected to the second switching element and located adjacent to the first pixel electrode in a direction parallel to a first direction; and
a third pixel electrode connected to the third switching element,
wherein the third pixel electrode comprises:
a first divided pixel electrode adjacent to the first pixel electrode in a direction parallel to a second direction crossing the first direction; and
a second divided pixel electrode adjacent to the first divided pixel electrode in a direction parallel to the first direction and adjacent to the second pixel electrode in a direction parallel to the second direction; and
wherein at least a portion of at least one of the first data line, the second data line, and the third data line is located between the first divided pixel electrode and the second divided pixel electrode.

30. The display device as claimed in claim 29, wherein the first pixel electrode, the second pixel electrode and the third pixel electrode are comprised in one unit pixel.

31. The display device as claimed in claim 29, wherein each of the first substrate and the second substrate has a curved surface curved along a direction parallel to the first direction.

32. The display device as claimed in claim 29, further comprising a light blocking layer between the first substrate and the second substrate,
wherein the light blocking layer comprises:
a first light blocking portion overlapping an area between the first pixel electrode and the second pixel electrode and overlapping facing edge portions of the first pixel electrode and the second pixel electrode; and
a second light blocking portion overlapping an area between the first divided pixel electrode and the second divided pixel electrode and overlapping facing edge portions of the first divided pixel electrode and the second divided pixel electrode.

33. The display device as claimed in claim 32, wherein a width of the first light blocking portion in a direction parallel to the first direction is substantially equal to a width of the second light blocking portion in a direction parallel to the first direction.

34. The display device as claimed in claim 32, wherein the first light blocking portion and the second light blocking portion are unitary.

35. The display device as claimed in claim 34, wherein the first light blocking portion and the second light blocking portion which are unitary have a straight line shape.

36. The display device as claimed in claim 29, wherein at least two of the first pixel electrode, the second pixel electrode and the third pixel electrode have different sizes.

37. The display device as claimed in claim 29, wherein a distance between the first pixel electrode and the second pixel electrode is substantially equal to a distance between the first divided pixel electrode and the second divided pixel electrode.

38. The display device as claimed in claim 29, wherein the first pixel electrode is located at a first quadrant of quadrants which are defined by the gate line and one of the first data line, the second data line and the third data line, the second pixel electrode is located at a second quadrant of the quadrants, the first divided pixel electrode is located at a third quadrant of the quadrants, and the second divided pixel electrode is located at a fourth quadrant of the quadrants.

39. The display device as claimed in claim 29, further comprising:
a first color layer located corresponding to the first pixel electrode;
a second color layer located corresponding to the second pixel electrode; and
a third color layer comprising a first divided color layer located corresponding to the first divided pixel electrode and a second divided color layer located corresponding to the second divided pixel electrode.

40. The display device as claimed in claim 39, wherein the first color layer, the second color layer and the third color layer are configured to emit lights of different colors, respectively, and
the first divided color layer and the second divided color layer are configured to emit lights of a substantially same color.

41. The display device as claimed in claim 39, wherein at least two of the first color layer, the second color layer and the third color layer have different sizes.

* * * * *